(12) United States Patent
Schindler et al.

(10) Patent No.: US 12,406,384 B2
(45) Date of Patent: Sep. 2, 2025

(54) DEPTH MEASUREMENT THROUGH DISPLAY

(71) Applicant: TRINAMIX GMBH, Ludwigshafen am Rhein (DE)

(72) Inventors: Patrick Schindler, Ludwigshafen (DE); Benjamin Rein, Ludwigshafen (DE); Christian Bonsignore, Ludwigshafen (DE); Michael Eberspach, Ludwigshafen (DE); Peter Schillen, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 18/468,327

(22) Filed: Sep. 15, 2023

(65) Prior Publication Data

US 2024/0005538 A1    Jan. 4, 2024

Related U.S. Application Data

(63) Continuation of application No. 17/756,552, filed as application No. PCT/EP2020/083468 on Nov. 26, 2020, now Pat. No. 11,989,896.

(30) Foreign Application Priority Data

Nov. 27, 2019    (EP) .................................. 19211927

(51) Int. Cl.
*G06T 7/521* (2017.01)
*G01B 11/22* (2006.01)
(Continued)

(52) U.S. Cl.
CPC .............. *G06T 7/521* (2017.01); *G01B 11/22* (2013.01); *G01B 11/2513* (2013.01);
(Continued)

(58) Field of Classification Search
CPC ..... G06T 7/521; G01B 11/22; G01B 11/2513; G06V 10/141; G06V 10/145;
(Continued)

(56) References Cited

U.S. PATENT DOCUMENTS 7,044,602 B2 *   5/2006   Chernyak ........... A61F 9/00804
                                                  606/4
7,744,534 B2 *   6/2010   Chalana .............. G01S 7/52065
                                                  600/407
(Continued)

FOREIGN PATENT DOCUMENTS

DE    202018003644 U1    8/2018
WO    2007/087405 A2     8/2007
(Continued)

OTHER PUBLICATIONS

International Search Report and Written Opinion for corresponding PCT/EP2020/083468 mailed Feb. 9, 2021, 15 Pages.

*Primary Examiner* — Kathleen Y Dulaney
(74) *Attorney, Agent, or Firm* — Armstrong Teasdale LLP

(57) ABSTRACT

Disclosed herein is a display device including
  a. at least one illumination source configured for projecting at least one illumination pattern comprising a plurality of illumination features on at least one scene;
  b. at least one optical sensor having at least one light sensitive area, wherein the optical sensor is configured for determining at least one first image comprising a plurality of reflection features generated by the scene in response to illumination by the illumination features;
  c. at least one translucent display configured for displaying information, wherein the illumination source and the optical sensor are placed in direction of propagation of the illumination pattern in front of the display; and
  d. at least one evaluation device for analyzing the first image, wherein the evaluation device is configured for
(Continued)

unambiguously matching of reflection features with corresponding illumination features.

19 Claims, 3 Drawing Sheets

(51) Int. Cl.
  *G01B 11/25* (2006.01)
  *G06V 10/141* (2022.01)
  *G06V 10/145* (2022.01)
  *G06V 10/147* (2022.01)
  *G06V 10/94* (2022.01)
  *G06V 20/64* (2022.01)

(52) U.S. Cl.
  CPC .......... *G06V 10/141* (2022.01); *G06V 10/145* (2022.01); *G06V 10/147* (2022.01); *G06V 10/94* (2022.01); *G06V 20/647* (2022.01)

(58) Field of Classification Search
  CPC .... G06V 10/147; G06V 10/94; G06V 20/647; G06V 2201/121
  USPC ........................... 382/154; 348/151; 356/610
  See application file for complete search history.

(56) References Cited

U.S. PATENT DOCUMENTS

| | | | |
|---|---|---|---|
| 9,630,629 B2 * | 4/2017 | Kim | G01J 5/0803 |
| 9,870,024 B2 * | 1/2018 | Evans, V | H04N 23/11 |
| 10,057,541 B2 | 8/2018 | Chung et al. | |
| 10,215,988 B2 | 2/2019 | Parker et al. | |
| 10,867,408 B1 * | 12/2020 | Sethi | G06T 7/74 |
| 11,158,074 B1 * | 10/2021 | Kantor | G01S 17/48 |
| 11,163,970 B1 * | 11/2021 | Sammoura | G06V 40/1318 |
| 11,461,908 B2 * | 10/2022 | Cao | G06V 20/647 |
| 11,627,262 B2 * | 4/2023 | Stec | H04N 23/20 348/164 |
| 11,641,460 B1 * | 5/2023 | Geusz | G06F 3/012 345/419 |
| 11,750,910 B2 * | 9/2023 | Wang | H04N 5/2624 348/47 |
| 2002/0196511 A1 * | 12/2002 | Huang | H04N 9/3164 348/E9.027 |
| 2003/0169904 A1 * | 9/2003 | Koele | G21K 5/04 382/111 |
| 2004/0105580 A1 * | 6/2004 | Hager | G06V 10/24 382/154 |
| 2005/0281475 A1 * | 12/2005 | Wilson | G06V 40/107 348/241 |
| 2006/0034537 A1 * | 2/2006 | Masaki | G06V 40/10 382/254 |
| 2006/0126457 A1 * | 6/2006 | Maeda | G11B 7/1369 369/112.01 |
| 2010/0054545 A1 * | 3/2010 | Elliott | A61B 90/36 382/115 |
| 2011/0255776 A1 * | 10/2011 | Mark | A63F 13/213 382/154 |
| 2014/0183342 A1 * | 7/2014 | Shedletsky | H10K 50/856 250/215 |
| 2014/0307055 A1 * | 10/2014 | Kang | G01B 11/2513 348/47 |
| 2016/0202051 A1 * | 7/2016 | Heist | G01B 11/2545 356/610 |
| 2016/0295116 A1 * | 10/2016 | Chieh | H04N 5/33 |
| 2019/0200000 A1 * | 6/2019 | Kumagai | B23K 26/0884 |
| 2019/0392599 A1 * | 12/2019 | Ohnishi | G06T 7/521 |
| 2020/0275000 A1 * | 8/2020 | Zhu | H04N 13/254 |
| 2020/0349714 A1 * | 11/2020 | Cheng | G06V 40/161 |
| 2021/0272302 A1 * | 9/2021 | Yang | G01B 11/22 |
| 2021/0334500 A1 * | 10/2021 | Huang | G06V 40/1318 |
| 2021/0406541 A1 * | 12/2021 | Ulbricht | G06V 30/274 |
| 2022/0245915 A1 * | 8/2022 | Nakade | G06V 40/145 |
| 2022/0398760 A1 * | 12/2022 | Matsumoto | G06V 10/761 |
| 2023/0403906 A1 * | 12/2023 | Metz | H10K 59/90 |

FOREIGN PATENT DOCUMENTS

| | | |
|---|---|---|
| WO | 2018/091640 A2 | 5/2018 |
| WO | 2018091638 A1 | 5/2018 |
| WO | 2018091649 A1 | 5/2018 |
| WO | 2019042956 A1 | 3/2019 |

\* cited by examiner

DEPTH MEASUREMENT THROUGH DISPLAY

CROSS-REFERENCE TO RELATED APPLICATIONS

This application is a continuation application of U.S. application Ser. No. 17/756,552, filed May 26, 2022, which is a U.S. National Phase Application of International Patent Application No. PCT/EP2020/083468, filed Nov. 26, 2020, which claims priority to European Patent Application No. 19211927.9, filed Nov. 27, 2019, each of which is hereby incorporated by reference herein.

DESCRIPTION

Field of the Invention

The invention relates to a display device and a method for depth measurement through a translucent display and various uses of the display device. The devices, methods and uses according to the present invention specifically may be employed for example in various areas of daily life, security technology, gaming, traffic technology, production technology, photography such as digital photography or video photography for arts, documentation or technical purposes, safety technology, information technology, agriculture, crop protection, maintenance, cosmetics, medical technology or in the sciences. However, other applications are also possible.

Prior Art

Several display devices are known. Recent developments for devices with a display show that the display area should cover the whole space that is available and the frame surrounding the display should be as small as possible. This results in that electronic components and sensors, e.g. front facing camera, flashlight, proximity sensor and even 3D imaging sensors, cannot be arranged within the frame any longer but have to be placed under the display. However, most common 3D imaging techniques and systems such as 3D imaging system based on structured light or 3D-time of flight (ToF) cannot be placed under the display without more ado.

Until now, it is not known that a 3D imaging system based on structured light or 3D-ToF works under a display, i.e. without making empty windows that do not contain any microcircuits and/or microwiring, for placing the components or devices of the 3D imaging system to "see" through these windows.

For structured light, the main problem is the microstructure of the microcircuits and/or microwiring of the transparent display and, consequently, the low light transmission through the display. This microstructure results from the electrode matrix for addressing the single pixels. Also, the pixels itself represent an inverted grating because the metal cathode of the single pixel is not transparent. In principal the display structure could be made transparent or translucent as a whole, including the electrodes, by using specific materials until now there is no transparent or translucent display which does not have a grating like microstructure.

Structured-light based 3D imagers are based on projecting a point cloud, with several thousand points and with well know patterns, into a scenery. The microstructure of the transparent or translucent display works like a diffraction grating structure for laser light. As most of the projectors of structured light imagers are based on a laser source that projects a well-defined dot pattern, this pattern experiences a grating effect of the display and every single spot of the dot pattern will show higher diffraction orders. This has a devastating effect for a structured light imager, because the additional and unwanted points caused by the grating structure make it highly complicated for its algorithm to retrieve the original expected patterns.

Furthermore, the number of projection points used for traditional structured light imagers are rather high. As a transparent display has a very low light transmission, e.g. even in the infrared (IR) at 850 nm and 940 nm which are the typical wavelength for 3D-imagers, very high output powers are needed for the structured light projectors to get enough power through the display which could be detected by the imager, which also must be located under the display which leads to an additional light absorption. The combination of a high number of points and a low light transmission may lead to a low ambient light robustness.

For 3D-ToF sensors, the reflections on the display surfaces, which lead to multiple reflections, as well as the difference for delays when the light passes through the display, different display structures have different refractive indices, and prevents robust functionality when used behind a display. Furthermore, 3D-ToF sensors also need a high amount of light to illuminate the scenery. In addition, illumination should be homogeneous. The low light transmission of the display makes it hard to provide enough light and the grating structure influences the homogeneity of the illumination.

Common 3D sensing systems have problems to measure through transparent displays. Current devices use notches in the display. By that way, the sensors are not disturbed by the diffractive optical effects.

DE 20 2018 003 644 U1 describes a portable electronic device, comprising: a bottom wall and side walls defining a cavity in cooperation with the bottom wall, the side walls having edges defining an opening leading into the cavity; a protective layer covering the opening and enclosing the cavity; a vision subsystem disposed within the cavity and between the protective layer and the bottom wall and serving to provide a depth map of an object outside the protective layer, the vision subsystem comprising: a clip assembly for carrying optical components that cooperate to generate information for the depth map, the clip assembly comprising: a first bracket arranged to support and hold the optical components at a fixed distance from each other and a second bracket having a body secured to the first bracket, wherein the second bracket has a projection extending away from the body.

U.S. Pat. No. 9,870,024 B2 describes an electronic display which includes several layers, such as a cover layer, a color filter layer, a display layer including light emitting diodes or organic light emitting diodes, a thin film transistor layer, etc. In one embodiment, the layers include a substantially transparent region disposed above the camera. The substantially transparent region allows light from outside to reach the camera, enabling the camera to record an image.

U.S. Pat. No. 10,057,541 B2 describes an image capturing apparatus and a photographing method. The image capturing apparatus comprises: a transparent display panel; and a camera facing a bottom surface of the transparent display panel for synchronizing a shutter time with a period when the transparent display panel displays a black image, and for capturing an image positioned in front of the transparent display panel.

U.S. Pat. No. 10,215,988 B2 describes an optical system for displaying light from a scene which includes an active optical component that includes a first plurality of light directing apertures, an optical detector, a processor, a display, and a second plurality of light directing apertures. The first plurality of light directing apertures is positioned to provide an optical input to the optical detector. The optical detector is positioned to receive the optical input and convert the optical input to an electrical signal corresponding to intensity and location data. The processor is connected to receive the data from the optical detector and process the data for the display. The second plurality of light directing apertures is positioned to provide an optical output from the display.

WO 2019/042956 A1 describes a detector for determining a position of at least one object. The detector comprises —at least one sensor element having a matrix of optical sensors, the optical sensors each having a light-sensitive area, wherein each optical sensor is designed to generate at least one sensor signal in response to an illumination of its respective light-sensitive area by a reflection light beam propagating from the object to the detector, wherein the sensor element is adapted to determine at least one reflection image; —at least one evaluation device, wherein the evaluation device is adapted to select at least one reflection feature of the reflection image, wherein the evaluation device is configured for determining at least one longitudinal region of the selected reflection feature of the reflection image by evaluating a combined signal Q from the sensor signals, wherein the evaluation device is adapted to determine at least one displacement region in at least one reference image corresponding to the longitudinal region, wherein the evaluation device is adapted to match the selected reflection feature with at least one reference feature within the displacement region.

Problem Addressed by the Invention

It is therefore an object of the present invention to provide devices and methods facing the above-mentioned technical challenges of known devices and methods. Specifically, it is an object of the present invention to provide devices and methods which allow reliable depth measurement through a display with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a display device is disclosed. As used herein, the term "display" may refer to an arbitrary shaped device configured for displaying an item of information such as at least one image, at least one diagram, at least one histogram, at least one text, at least one sign. The display may be at least one monitor or at least one screen. The display may have an arbitrary shape, preferably a rectangular shape. As used herein, the term "display device" generally may refer to at least one electronic device comprising at least one display. For example, the display device may be at least one device selected from the group consisting of: a television device, smart phones, game consoles, personal computers, laptops, tablets, at least one virtual reality device, or combinations thereof.

The display device comprises
- at least one illumination source configured for projecting at least one illumination pattern comprising a plurality of illumination features on at least one scene;
- at least one optical sensor having at least one light sensitive area, wherein the optical sensor is configured for determining at least one first image comprising a plurality of reflection features generated by the scene in response to illumination by the illumination features;
- at least one translucent display configured for displaying information, wherein the illumination source and the optical sensor are placed in direction of propagation of the illumination pattern in front of the display;
- at least one evaluation device, wherein the evaluation device is configured for evaluating the first image, wherein the evaluation of the first image comprises identifying the reflection features of the first image and sorting the identified reflection features with respect to brightness, wherein each of the reflection features comprises at least one beam profile, wherein the evaluation device is configured for determining at least one longitudinal coordinate $z_{DPR}$ for each of the reflection features by analysis of their beam profiles, wherein the evaluation device is configured for unambiguously matching of reflection features with corresponding illumination features by using the longitudinal coordinate $z_{DPR}$, wherein the matching is performed with decreasing brightness of the reflection features starting with the brightest reflection feature, wherein the evaluation device is configured for classifying a reflection feature being matched with an illumination feature as real feature and for classifying a reflection feature not being matched with an illumination feature as false feature, wherein the evaluation device is configured for rejecting the false features and for generating a depth map for the real features by using the longitudinal coordinate $z_{DPR}$.

As used herein, the term "scene" may refer to at least one arbitrary object or spatial region. The scene may comprise the at least one object and a surrounding environment.

The illumination source is configured for projecting at least one illumination pattern comprising a plurality of illumination features on the scene. As used herein, the term "illumination source" may generally refers to at least one arbitrary device adapted to provide the at least one illumination light beam for illumination of the scene. The illumination source may be adapted to directly or indirectly illuminating the scene, wherein the illumination pattern is reflected or scattered by surfaces of the scene and, thereby, is at least partially directed towards the optical sensor. The illumination source may be adapted to illuminate the scene, for example, by directing a light beam towards the scene, which reflects the light beam. The illumination source may be configured for generating an illuminating light beam for illuminating the scene.

The illumination source may comprise at least one light source. The illumination source may comprise a plurality of light sources. The illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. The illumination source may be configured for generating the at least one illumination pattern in the infrared region. Using light in the near infrared region allows that light is not or only weakly detected by human eyes and is still detectable by silicon sensors, in particular standard silicon sensors.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however.

The illumination source may be configured for emitting light at a single wavelength. Specifically, the wavelength may be in the near infrared region. In other embodiments, the illumination may be adapted to emit light with a plurality of wavelengths allowing additional measurements in other wavelengths channels The illumination source may be or may comprise at least one multiple beam light source. For example, the illumination source may comprise at least one laser source and one or more diffractive optical elements (DOEs). Specifically, the illumination source may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination source may comprise one or more diffractive optical elements (DOEs) adapted to generate the illumination pattern. For example, the illumination source may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination source is particularly preferred. The illumination source may be integrated into a housing of the display device.

In one embodiment, the illumination source may be a single or multiple beam source and may configured for projecting the at least one illumination pattern such as at least one point pattern. The illumination pattern may be generated as follows. The illumination source may be configured for generating at least one light beam. The illumination source may be placed in direction of propagation of the illumination pattern in front of the display. Thus, the beam path of the light beam may pass from the illumination source through the display to the scene. During its pass through the display the light beam may experience diffraction by the display which may result in the characteristic illumination pattern such as the point pattern. The display in this embodiment may function as grating. A wiring of the display, in particular of a screen, may be configured for forming gaps and/or slits and ridges of the grating.

Further, the illumination source may be configured for emitting modulated or non-modulated light. In case a plurality of illumination sources is used, the different illumination sources may have different modulation frequencies which, as outlined in further detail below, later on may be used for distinguishing the light beams.

The light beam or light beams generated by the illumination source generally may propagate parallel to the optical axis or tilted with respect to the optical axis, e.g. including an angle with the optical axis. The display device may be configured such that the light beam or light beams propagates from the display device towards the scene along an optical axis of the display device. For this purpose, the display device may comprise at least one reflective element, preferably at least one prism, for deflecting the illuminating light beam onto the optical axis. As an example, the light beam or light beams, such as the laser light beam, and the optical axis may include an angle of less than 10°, preferably less than 5° or even less than 2°. Other embodiments, however, are feasible. Further, the light beam or light beams may be on the optical axis or off the optical axis. As an example, the light beam or light beams may be parallel to the optical axis having a distance of less 10 than 10 mm to the optical axis, preferably less than 5 mm to the optical axis or even less than 1 mm to the optical axis or may even coincide with the optical axis.

As used herein, the term "at least one illumination pattern" refers to at least one arbitrary pattern comprising at least one illumination feature adapted to illuminate at least one part of the scene. As used herein, the term "illumination feature" refers to at least one at least partially extended feature of the pattern. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination source may be adapted to generate and/or to project a cloud of points. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source.

A distance between two features of the illumination pattern and/or an area of the at least one illumination feature may depend on the circle of confusion in the image. As outlined above, the illumination source may comprise the at least one light source configured for generating the at least one illumination pattern. Specifically, the illumination source comprises at least one laser source and/or at least one laser diode which is designated for generating laser radiation. The illumination source may comprise the at least one diffractive optical element (DOE). The display device may comprise at least one point projector, such as the at least one laser source and the DOE, adapted to project at least one periodic point pattern.

As further used herein, the term "projecting at least one illumination pattern" refers to providing the at least one illumination pattern for illuminating the at least one scene.

For example, the projected illumination pattern may be a periodic point pattern. The projected illumination pattern may have a low point density. For example, the illumination pattern may comprise at least one periodic point pattern having a low point density, wherein the illumination pattern has ≤2500 points per field of view. In comparison with structured light having typically a point density of 10 k-30 k in a field of view of 55×38° the illumination pattern according to the present invention may be less dense. This may allow more power per point such that the proposed technique is less dependent on ambient light compared to structured light.

The display device may comprise a single camera comprising the optical sensor. The display device may comprise a plurality of cameras each comprising an optical sensor or a plurality of optical sensors.

The optical sensor has at least one light sensitive area. As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. The display device may comprise a plurality of optical sensors each having a light sensitive area. As used herein, the term "the optical sensors each having at least one light sensitive area" refers to configurations with a plurality of single optical sensors each having one light sensitive area and to configurations with one combined optical sensor having a plurality of light sensitive areas. The term "optical sensor" furthermore refers to a light-sensitive device configured to generate one output signal. In case the display device comprises a plurality of optical sensors, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the display device specifically simple and efficient. Thus, as an example, commercially available photo-sensors, such as commercially available silicon photodiodes, each having precisely one sensitive area, may be used in the set-up. Other embodiments, however, are feasible.

Preferably, the light sensitive area may be oriented essentially perpendicular to an optical axis of the display device. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The optical sensor specifically may be or may comprise at least one photodetector, preferably inorganic photodetectors, more preferably inorganic semiconductor photodetectors, most preferably silicon photodetectors. Specifically, the optical sensor may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor may be or may comprise at least one inorganic photodiode which are sensitive in the infrared spectral range, preferably in the range of 700 nm to 3.0 micrometers. Specifically, the optical sensor may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensor may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor may comprise at least one photoconductive sensor such as a PbS or PbSe sensor, a bolometer, preferably a bolometer selected from the group consisting of a VO bolometer and an amorphous Si bolometer.

The optical sensor may be sensitive in one or more of the ultraviolet, the visible or the infrared spectral range. Specifically, the optical sensor may be sensitive in the visible spectral range from 500 nm to 780 nm, most preferably at 650 nm to 750 nm or at 690 nm to 700 nm. Specifically, the optical sensor may be sensitive in the near infrared region. Specifically, the optical sensor may be sensitive in the part of the near infrared region where silicon photodiodes are applicable specifically in the range of 700 nm to 1000 nm. The optical sensor, specifically, may be sensitive in the infrared spectral range, specifically in the range of 780 nm to 3.0 micrometers. For example, the optical sensor each, independently, may be or may comprise at least one element selected from the group consisting of a photodiode, a photocell, a photoconductor, a phototransistor or any combination thereof. For example, the optical sensor may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The optical sensor may comprise at least one sensor element comprising a matrix of pixels. Thus, as an example, the optical sensor may be part of or constitute a pixelated optical device. For example, the optical sensor may be and/or may comprise at least one CCD and/or CMOS device. As an example, the optical sensor may be part of or constitute at least one CCD and/or CMOS device having a matrix of pixels, each pixel forming a light-sensitive area.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. The sensor element comprises a matrix of optical sensors. The sensor element may comprise at least one CMOS sensor. The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the sensor element may be and/or may comprise at least one CCD and/or CMOS device and/or the optical sensors may form a sensor array or may be part of a sensor array, such as the above-mentioned matrix. Thus, as an example, the sensor element may comprise an array of pixels, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensor may be and/or may comprise at least one CCD and/or CMOS device and/or the optical sensors of the display device may form a sensor array or may be part of a sensor array, such as the above-mentioned matrix.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Thus, as an example, the sensor element may be part of or constitute a pixelated optical device. For example, the sensor element may be and/or may comprise at least one CCD and/or CMOS device. As an example, the sensor element may be part of or constitute at least one CCD and/or CMOS device having a matrix of pixels, each pixel forming a light-sensitive area. The sensor element may employ a rolling shutter or global shutter method to read out the matrix of optical sensors.

The display device further may comprise at least one transfer device. The display device may further comprise one or more additional elements such as one or more additional optical elements. The display device may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensor. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the display device and the transfer device have a common optical axis. As used herein, the term "optical axis of the transfer device" generally refers to an axis of mirror symmetry or rotational symmetry of the lens or lens system. The optical axis of the display device may be a line of symmetry of the optical setup of the display device. The display device comprises at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, as will also be outlined in further detail below, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the display device may have a single beam path along which a light beam may travel from the object to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths.

The transfer device may constitute a coordinate system, wherein a longitudinal coordinate is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The display device may constitute a coordinate system in which an optical axis of the display device forms the z-axis and in which, additionally, an x-axis and a y-axis may be provided which are perpendicular to the z-axis and which are perpendicular to each other. As an example, the display device and/or a part of the display device may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The optical sensor is configured for determining at least one first image comprising a plurality of reflection features generated by the scene in response to illumination by the illumination features. As used herein, without limitation, the term "image" specifically may relate to data recorded by using the optical sensor, such as a plurality of electronic readings from an imaging device, such as the pixels of the sensor element. The image itself, thus, may comprise pixels, the pixels of the image correlating to pixels of the matrix of the sensor element. Consequently, when referring to "pixels", reference is either made to the units of image information generated by the single pixels of the sensor element or to the single pixels of the sensor element directly. As used herein, the term "two dimensional image" may generally refer to an image having information about transversal coordinates such as the dimensions of height and width only. As used herein, the term "three dimensional image" may generally refer to an image having information about transversal coordinates and additionally about the longitudinal coordinate such as the dimensions of height, width and depth. As used herein, the term "reflection feature" may refer to a feature in an image plane generated by the scene in response to illumination, specifically with at least one illumination feature.

The display device comprises the at least one translucent display configured for displaying information. As used herein, the term "translucent" may refer to a property of the display to allow light, in particular of a certain wavelength range, to pass through. The illumination source and the optical sensor are placed in direction of propagation of the illumination pattern in front of the display. The illumination source and the optical sensor may be arranged in a fixed position with respect to each other. For example, the setup of the display device may comprise a camera, comprising the optical sensor and a lens system, and a laser projector. The laser projector and the camera may be fixed, in a direction of propagation of light reflected by the scene, behind the translucent display. The laser projector may generate a dot pattern and shines through the display. The camera may look through the display. The arrangement of the illumination source and optical sensor in a direction of propagation of light reflected by the scene, behind the translucent display, however, may result in that diffraction grating of the display generates multiple laser points on the scene and also in the first image. Thereby these multiple spots on the first image may not include any useful distance information. As will be outlined in detail below, the evaluation device may be configured for finding and evaluating the reflection features of the zero order of diffraction grating, i.e. real features, and may neglect the reflection features of the higher orders, i.e. false features.

The display device comprises the at least one evaluation device. The evaluation device is configured for evaluating the first image. As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations. Operations, including evaluating the images. Specifically the determining the beam profile and indication of the surface, may be performed by the at least one evaluation device. Thus, as an example, one or more instructions may be implemented in software and/or hardware. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation device and the display device may fully or partially be integrated into a single device. Thus, generally, the evaluation device also may form part of the display device. Alternatively, the evaluation device and the display device may fully or partially be embodied as separate devices. The display device may comprise further components.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as Camera-Link. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

The evaluation device is configured for evaluating of the first image. The evaluation of the first image comprises identifying the reflection features of the first image. The evaluation device may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image generated by the optical sensor.

For example, the illumination source may be configured for generating and/or projecting a cloud of points such that a plurality of illuminated regions is generated on the optical sensor, for example the CMOS detector. Additionally, disturbances may be present on the optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or an edge filter and/or object recognition method.

The evaluation device may be configured for performing at least one image correction. The image correction may comprise at least one background subtraction. The evaluation device may be adapted to remove influences from background light from the beam profile, for example, by an imaging without further illumination.

Each of the reflection features comprises at least one beam profile. As used herein, the term "beam profile" of the reflection feature may generally refer to at least one intensity distribution of the reflection feature, such as of a light spot on the optical sensor, as a function of the pixel. The beam profile may be selected from the group consisting of a trapezoid beam profile; a triangle beam profile; a conical beam profile and a linear combination of Gaussian beam profiles. The evaluation device is configured for determining beam profile information for each of the reflection features by analysis of their beam profiles.

The evaluation device is configured for determining at least one longitudinal coordinate $z_{DPR}$ for each of the reflection features by analysis of their beam profiles. As used herein, the term "analysis of the beam profile" may generally refer to evaluating of the beam profile and may comprise at least one mathematical operation and/or at least one comparison and/or at least symmetrizing and/or at least one filtering and/or at least one normalizing. For example, the analysis of the beam profile may comprise at least one of a histogram analysis step, a calculation of a difference measure, application of a neural network, application of a machine learning algorithm. The evaluation device may be configured for symmetrizing and/or for normalizing and/or for filtering the beam profile, in particular to remove noise or asymmetries from recording under larger angles, recording edges or the like. The evaluation device may filter the beam profile by removing high spatial frequencies such as by spatial frequency analysis and/or median filtering or the like. Summarization may be performed by center of intensity of the light spot and averaging all intensities at the same distance to the center. The evaluation device may be configured for normalizing the beam profile to a maximum intensity, in particular to account for intensity differences due to the recorded distance. The evaluation device may be configured for removing influences from background light from the beam profile, for example, by an imaging without illumination.

The reflection feature may cover or may extend over at least one pixel of the image. For example, the reflection feature may cover or may extend over plurality of pixels. The evaluation device may be configured for determining and/or for selecting all pixels connected to and/or belonging to the reflection feature, e.g. a light spot. The evaluation device may be configured for determining the center of intensity by $$R_{coi} = \frac{1}{I \cdot \sum j \cdot r_{pixel}},$$

wherein $R_{coi}$ is a position of center of intensity, $r_{pixel}$ is the pixel position and $I=\Sigma_j I_{total}$ with j being the number of pixels j connected to and/or belonging to the reflection feature and $I_{total}$ being the total intensity.

The evaluation device may be configured for determining the longitudinal coordinate $z_{DPR}$ for each of the reflection features by using depth-from-photon-ratio technique, also denoted beam profile analysis. With respect to depth-from-photon-ratio (DPR) technique reference is made to WO 2018/091649 A1, WO 2018/091638 A1 and WO 2018/091640 A1, the full content of which is included by reference.

The evaluation device may be configured for determining the beam profile of each of the reflection features. As used herein, the term "determining the beam profile" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The analysis of the beam profile of one of the reflection features may comprise determining at least one first area and at least one second area of the beam profile. The first area of the beam profile may be an area A1 and the second area of the beam profile may be an area A2. The evaluation device may be configured for integrating the first area and the second area. The evaluation device may be configured to derive a combined signal, in particular a quotient Q, by one or more of dividing the integrated first area and the integrated second area, dividing multiples of the integrated first area and the integrated second area, dividing linear combinations of the integrated first area and the integrated second area. The evaluation device may configured for determining at least two areas of the beam profile and/or to segment the beam profile in at least two segments comprising different areas of the beam profile, wherein overlapping of the areas may be possible as long as the areas are not congruent. For example, the evaluation device may be configured for determining a plurality of areas such as two, three, four, five, or up to ten areas. The evaluation device may be configured for segmenting the light spot into at least two areas of the beam profile and/or to segment the beam profile in at least two segments comprising different areas of the beam profile. The evaluation device may be configured for determining for at least two of the areas an integral of the beam profile over the respective area. The evaluation device may be configured for comparing at least two of the determined integrals. Specifically, the evaluation device may be configured for determining at least one first area and at least one second area of the beam profile. As used herein, the term "area of the beam profile" generally refers to an arbitrary region of the beam profile at the position of the optical sensor used for determining the quotient Q. The first area of the beam profile and the second area of the beam profile may be one or both of adjacent or overlapping regions. The first area of the beam profile and the second area of the beam profile may be not congruent in area. For example, the evaluation device may be configured for dividing a sensor region of the CMOS sensor into at least two sub-regions, wherein the evaluation device may be configured for dividing the sensor region of the CMOS sensor into at least one left part and at least one right part and/or at least one upper part and at least one lower part and/or at least one inner and at least one outer part. Additionally or alternatively, the display device may comprise at least two optical sensors, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The evaluation device may be adapted to integrate the first area and the second area. The evaluation device may be configured for using at least one predetermined relationship between the quotient Q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The first area of the beam profile may comprise essentially edge information of the beam profile and the second area of the beam profile comprises essentially center information of the beam profile, and/or the first area of the beam profile may comprise essentially information about a left part of the beam profile and the second area of the beam profile comprises essentially information about a right part of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably, the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be configured for determining an area integral of the beam profile. The evaluation device may be configured for determining the edge information by integrating and/or summing of the first area. The evaluation device may be configured for determining the center information by integrating and/or summing of the second area. For example, the beam profile may be a trapezoid beam profile and the evaluation device may be configured for determining an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In one embodiment, the illumination pattern may comprise at least one line pattern. A1 may correspond to an area with a full line width of the line pattern on the optical sensors, in particular on the light sensitive area of the optical sensors. The line pattern on the optical sensor may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensor. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

In one embodiment, the illumination pattern may comprise at least point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The illumination pattern may comprise both at least one point pattern and at least one line pattern. Other embodiments in addition or alternatively to line pattern and point pattern are feasible.

The evaluation device may be configured to derive the quotient Q by one or more of dividing the first area and the second area, dividing multiples of the first area and the second area, dividing linear combinations of the first area and the second area. The evaluation device may be configured for deriving the quotient Q by $$Q = \frac{\iint_{A1} E(x, y)dxdy}{\iint_{A2} E(x, y)dxdy}$$

wherein x and y are transversal coordinates, A1 and A2 are the first and second area of the beam profile, respectively, and E(x,y) denotes the beam profile.

Additionally or alternatively, the evaluation device may be adapted to determine one or both of center information or edge information from at least one slice or cut of the light spot. This may be realized, for example, by replacing the area integrals in the quotient Q by a line integral along the slice or cut. For improved accuracy, several slices or cuts through the light spot may be used and averaged. In case of an elliptical spot profile, averaging over several slices or cuts may result in improved distance information.

For example, in case of the optical sensor having a matrix of pixels, the evaluation device may be configured for evaluating the beam profile, by
  determining the pixel having the highest sensor signal and forming at least one center signal;
  evaluating sensor signals of the matrix and forming at least one sum signal;
  determining the quotient Q by combining the center signal and the sum signal; and
  determining at least one longitudinal coordinate z of the object by evaluating the quotient Q.

As used herein, a "sensor signal" generally refers to a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the display device, the optical sensor or any other element may be adapted to process or preprocess the sensor signal, thereby generating secondary sensor signals, which may also be used as sensor signals, such as preprocessing by filtering or the like. The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the pixel having the highest sensor signal out of the plurality of sensor signals generated by the pixels of the entire matrix or of a region of interest within the matrix, wherein the region of interest may be predetermined or determinable within an image generated by the pixels of the matrix. The center signal may arise from a single pixel or from a group of optical sensors, wherein, in the latter case, as an example, the sensor signals of the group of pixels may be added up, integrated or averaged, in order to determine the center signal. The group of pixels from which the center signal arises may be a group of neighboring pixels, such as pixels having less than a predetermined distance from the actual pixel having the highest sensor signal, or may be a group of pixels generating sensor signals being within a predetermined range from the highest sensor signal. The group of pixels from which the center signal arises may be chosen as large as possible in order to allow maximum dynamic range. The evaluation device may be adapted to determine the center signal by integration of the plurality of sensor signals, for example the plurality of pixels around the pixel having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the pixel in the center of the light spot, or may be a combination of a plurality of sensor signals, such as a combination of sensor signals arising from pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of pixels containing the pixel having the highest sensor signal and a predetermined group of neighboring pixels; a sum of sensor signals from a group of pixels containing the pixel having the highest sensor signal and a predetermined group of neighboring pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring pixels; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The quotient Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the quotient Q may comprise an arbitrary signal or signal combination which contains at least one item of information on a comparison between the center signal and the sum signal.

As used herein, the term "longitudinal coordinate of the object" refers to a distance between the optical sensor and the object. The evaluation device may be configured for using the at least one predetermined relationship between the quotient Q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device may be configured for executing at least one depth-from-photon-ratio algorithm which computes distances for all reflection features with zero order and higher order.

The evaluation of the first image comprises sorting the identified reflection features with respect to brightness. As used herein, the term "sorting" may refer to assigning a sequence of the reflection features for further evaluation with respect to brightness, in particular starting with the reflection feature having maximum brightness and subsequent the reflection features with decreasing brightness. As used herein, the term "brightness" may refer to magnitude of the reflection feature in the first image and/or intensity of the reflection feature in the first image. The brightness may refer to a defined passband, such as in the visible or infrared spectral range, or may be wavelengths independent. The sorting with decreasing brightness may refer to sorting according to decreasing brightness and/or sorting with respect to decreasing brightness. The robustness of the determining of the longitudinal coordinate $z_{DPR}$ can be increased if the brightest reflection features are preferred for DPR computation. This is mainly because reflection features with zero order of diffraction grating are always brighter than false features with a higher order.

The evaluation device is configured for unambiguously matching of reflection features with corresponding illumination features by using the longitudinal coordinate $z_{DPR}$. The longitudinal coordinate determined with the depth-from-photon-ratio technique can be used for solving the so called correspondence problem. In that way, distance information per reflection feature can be used to find the correspondence of the known laser projector grid. As used herein, the term "matching" refers to identifying and/or determining and/or evaluating the corresponding illumination features and reflection features. As used herein, the term "corresponding illumination features and reflection features" may refer to the fact that each of the illumination features of the illumination pattern generates at the scene a reflection feature, wherein the generated reflection feature is assigned to the illumination feature having generated said reflection feature.

As used herein, the term "unambiguously matching" may refer to that only one reflection feature is assigned to one illumination feature and/or that no other reflection features can be assigned to the same matched illumination feature.

The illumination feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that an illumination image, i.e. an image of the non-distorted illumination pattern, and the first image may be images determined at different spatial positions and/or spatial orientations having a fixed distance. The distance may be a relative distance, also denoted as baseline. The illumination image may be also denoted as reference image. The evaluation device may be adapted to determine an epipolar line in the reference image. The relative position of the reference image and first image may be known. For example, the relative position of the reference image and the first image may be stored within at least one storage unit of the evaluation device. The evaluation device may be adapted to determine a straight line extending from a selected reflection feature of the first image to a real world feature from which it originates. Thus, the straight line may comprise possible object features corresponding to the selected reflection feature. The straight line and the baseline span an epipolar plane. As the reference image is determined at a different relative constellation from the first image, the corresponding possible object features may be imaged on a straight line, called epipolar line, in the reference image. The epipolar line may be the intersection of the epipolar plane and the reference image. Thus, a feature of the reference image corresponding to the selected feature of the first image lies on the epipolar line.

Depending on the distance to the object of the scene having reflected the illumination feature, the reflection feature corresponding to the illumination feature may be displaced within the first image. The reference image may comprise at least one displacement region in which the illumination feature corresponding to the selected reflection feature would be imaged. The displacement region may comprise only one illumination feature. The displacement region may also comprise more than one illumination feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device may be adapted to determine the illumination feature along the epipolar line. The evaluation device may be adapted to determine the longitudinal coordinate z for the reflection feature and an error interval±ε from the combined signal Q to determine a displacement region along an epipolar line corresponding to z±ε or orthogonal to an epipolar line. The measurement uncertainty of the distance measurement using the combined signal Q may result in a displacement region in the second image which is non-circular since the measurement uncertainty may be different for different directions. Specifically, the measurement uncertainty along the epipolar line or epipolar lines may be greater than the measurement uncertainty in an orthogonal direction with respect to the epipolar line or lines. The displacement region may comprise an extend in an orthogonal direction with respect to the epipolar line or epipolar lines. The evaluation device may be adapted to match the selected reflection feature with at least one illumination feature within the displacement region. The evaluation device may be adapted to match the selected feature of the first image with the illumination feature within the displacement region by using at least one evaluation algorithm considering the determined longitudinal coordinate $z_{DPR}$. The evaluation algorithm may be a linear scaling algorithm. The evaluation device may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device may be adapted to determine an epipolar line before determining a corresponding illumination feature. The evaluation device may determine a displacement region around the image position of each reflection feature. The evaluation device may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device may be adapted to determine the illumination feature corresponding to the reflection feature by determining the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be configured to perform the following steps:
  Determining a displacement region for the image position of each reflection feature;
  Assigning an epipolar line to the displacement region of each reflection feature such as by assigning the epipolar line closest to a displacement region and/or within a displacement region and/or closest to a displacement region along a direction orthogonal to the epipolar line;
  Assigning and/or determining at least one illumination feature to each reflection feature such as by assigning the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device may be adapted to decide between more than one epipolar line and/or illumination feature to be assigned to a reflection feature such as by comparing distances of reflection features and/or epipolar lines within the illumination image and/or by comparing error weighted distances, such as ε-weighted distances of illumination features and/or epipolar lines within the illumination image and assigning the epipolar line and/or illumination feature in shorter distance and/or ε-weighted distance to the illumination feature and/or reflection feature.

As outlined above, due to diffraction grating a plurality of reflection features, e.g. for each illumination feature one real feature and a plurality of false features, are generated. The matching is performed with decreasing brightness of the reflection features starting with the brightest reflection feature. No other reflection feature can be assigned to the same matched illumination feature. In due of the display artifacts, the false features which are generated are generally darker than the real features. By sorting the reflection features by brightness, brighter reflection features are preferred for the correspondence matching. If a correspondence of an illumination feature is already used, a false feature cannot be assigned to a used, i.e. matched, illumination feature.

The evaluation device is configured for classifying a reflection feature being matched with an illumination feature as real feature and for classifying a reflection feature not being matched with an illumination feature as false feature. As used herein, the term "classify" may refer to assigning the reflection feature to at least one category. As used herein, the term "real feature" may refer to a reflection feature of zero order of diffraction grating. As used herein, the term "false feature" may refer to a reflection feature of higher order of diffraction grating, i.e. with order Zero order of diffraction grating are always brighter than false features with a higher order.

The evaluation device is configured for rejecting the false features and for generating a depth map for the real features by using the longitudinal coordinate $z_{DPR}$. As used herein, the term "depth" may refer to a distance between the object and the optical sensor and may be given by the longitudinal coordinate. As used herein, the term "depth map" may refer to spatial distribution of depth. The display device may be used to generate a 3D map from a scene, e.g. of a face.

Structured light methods commonly use a camera and a projector with a fine point grid, e.g. several thousand points. A well-known projector pattern is used to find the correspondence of point patches on the scene. The distance information is achieved by triangulation if the correspondences of the points are solved. If the camera is behind the display, then the diffraction distorts the image spatially. Therefore, it is a challenging task to find point pattern on the distorted image. In comparison to structured light methods, the present invention proposes using the depth-from-photon-ratio technique for evaluating the beam profile which are not directly influenced by the diffraction grating of the display. The distortion does not touch the beam profile.

The depth map can be further refined by using a further depth measurement technique such as triangulation and/or depth-from-defocus and/or structured light. The evaluation device may be configured for determining at least one second longitudinal coordinate $z_{triang}$ for each of the reflection features using triangulation and/or depth-from-defocus and/or structured light techniques.

The evaluation device may be adapted to determine a displacement of the illumination feature and the reflection feature. The evaluation device may be adapted to determine the displacement of the matched illumination feature and the selected reflection feature. The evaluation device, e.g. at least one data processing device of the evaluation device, may be configured to determine the displacement of the illumination feature and the reflection feature, in particular by comparing the respective image position of the illumination image and the first image. As used herein, the term "displacement" refers to the difference between an image position in the illumination image to an image position in the first image. The evaluation device may be adapted to determine the second longitudinal coordinate of the matched feature using a predetermined relationship between the second longitudinal coordinate and the displacement. The evaluation device may be adapted to determine the predetermined relationship by using triangulation methods. In case the position of the selected reflection feature in the first image and the position of the matched illumination feature and/or the relative displacement of the selected reflection feature and the matched illumination feature are known, the longitudinal coordinate of the corresponding object feature may be determined by triangulation. Thus, the evaluation device may be adapted to select, for example subsequent and/or column by column, a reflection feature and to determine for each potential position of the illumination feature the corresponding distance value using triangulation. The displacement and the corresponding distance value may be stored in at least one storage device of the evaluation device. The evaluation device may, as an example, may comprise at least one data processing device, such as at least one processor, at least one DSP, at least one FPGA and/or at least one ASIC. Further, for storing the at least one predetermined or determinable relationship between the second longitudinal coordinate z and the displacement, the at least one data storage device may be provided, such as for providing one or more look-up tables for storing the predetermined relationship. The evaluation device may be adapted to store parameters for an intrinsic and/or extrinsic calibration of the camera and/or the display device. The evaluation device may be adapted to generate the parameters for an intrinsic and/or extrinsic calibration of the camera and/or the display device such as by performing a Tsai camera calibration. The evaluation device may be adapted to compute and/or estimate parameters such as the focal length of the transfer device, the radial lens distortion coefficient, the coordinates of the center of radial lens distortion, scale factors to account for any uncertainty due to imperfections in hardware timing for scanning and digitization, rotation angles for the transformation between the world and camera coordinates, translation components for the transformation between the world and camera coordinates, aperture angles, image sensor format, principal point, skew coefficients, camera center, camera heading, baseline, rotation or translation parameters between camera and/or illumination source, apertures, focal distance, or the like.

The evaluation device may be configured for determining a combined longitudinal coordinate of the second longitudinal coordinate $z_{triang}$ and the longitudinal coordinate $z_{DPR}$. The combined longitudinal coordinate may be a mean value of the second longitudinal coordinate $z_{triang}$ and the longitudinal coordinate $z_{DPR}$. The combined longitudinal coordinate may be used for determining the depth map.

The display device may comprise a further illumination source. The further illumination source may comprise at least one light emitting diode (LED). The further illumination source may be configured for generating light in the visual spectral range. The optical sensor may be configured for determining at least one second image comprising at least one two dimensional image of the scene. The further illumination source may be configured for providing additional illumination for imaging of the second image. For example, the setup of the display device can be extended by an additional flood illumination LED. The further illumination source may illuminate the scene, such as a face, with the LED and, in particular, without the illumination pattern, and the optical sensor may be configured for capturing the two-dimensional image. The 2D image may be used for face detection and verification algorithm. The distorted image captured by the optical sensor can be repaired, if an impulse response of the display is known. The evaluation device may be configured for determining at least one corrected image $I_0$ by deconvoluting the second image I with a grating function g, wherein $I=I_0*g$. The grating function is also denoted impulse response. The undistorted image can be restored by a deconvolution approach, e.g. Van-Cittert or Wiener Deconvolution. The display device may be configured for determining the grating function g. For example, the display device may be configured for illuminating a black scene with an illumination pattern comprising a small single bright spot. The captured image may be the grating function. This procedure may be performed only once such as during calibration. For determining a corrected image even for imaging through the display, the display device may be configured for capturing the image and use the deconvolution approach with the captured impulse response g. The resulting image may be a reconstructed image with less artifacts of the display and can be used for several applications, e.g. face recognition.

The evaluation device may be configured for determining at least one material property m of the object by evaluating the beam profile of at least one of the reflection features, preferably beam profiles of a plurality of reflection features. With respect to details of determining at least one material property by evaluating the beam profile reference is made to WO 2020/187719 the content of which is included by reference.

As used herein, the term "material property" refers to at least one arbitrary property of the material configured for characterizing and/or identification and/or classification of the material. For example, the material property may be a property selected from the group consisting of: roughness, penetration depth of light into the material, a property characterizing the material as biological or non-biological material, a reflectivity, a specular reflectivity, a diffuse reflectivity, a surface property, a measure for translucence, a scattering, specifically a back-scattering behavior or the like. The at least one material property may be a property selected from the group consisting of: a scattering coefficient, a translucency, a transparency, a deviation from a Lambertian surface reflection, a speckle, and the like. As used herein, the term "identifying at least one material property" refers to one or more of determining and assigning the material property to the object. The evaluation device may comprise at least one database comprising a list and/or table, such as a lookup list or a lookup table, of predefined and/or predetermined material properties. The list and/or table of material properties may be determined and/or generated by performing at least one test measurement using the display device according to the present invention, for example by performing material tests using samples having known material properties. The list and/or table of material properties may be determined and/or generated at the manufacturer site and/or by the user of the display device. The material property may additionally be assigned to a material classifier such as one or more of a material name, a material group such as biological or non-biological material, translucent or non-translucent materials, metal or nonmetal, skin or non-skin, fur or non-fur, carpet or non-carpet, reflective or non-reflective, specular reflective or non-specular reflective, foam or non-foam, hair or non-hair, roughness groups or the like. The evaluation device may comprise at least one database comprising a list and/or table comprising the material properties and associated material name and/or material group.

For example, without wishing to be bound by this theory, human skin may have a reflection profile, also denoted back scattering profile, comprising parts generated by back reflection of the surface, denoted as surface reflection, and parts generated by very diffuse reflection from light penetrating the skin, denoted as diffuse part of the back reflection. With respect to reflection profile of human skin reference is made to "Lasertechnik in der Medizin: Grundlagen, Systeme, Anwendungen", "Wirkung von Laserstrahlung auf Gewebe", 1991, pages 10 171 to 266, Jürgen Eichler, Theo Seiler, Springer Verlag, ISBN 0939-0979. The surface reflection of the skin may increase with the wavelength increasing towards the near infrared. Further, the penetration depth may increase with increasing wavelength from visible to near infrared. The diffuse part of the back reflection may increase with penetrating depth of the light. These properties may be used to distinguish skin from other materials, by analyzing the back scattering profile.

Specifically, the evaluation device may be configured for comparing the beam profile of the reflection feature, also denoted reflection beam profile, with at least one predetermined and/or prerecorded and/or predefined beam profile. The predetermined and/or prerecorded and/or predefined beam profile may be stored in a table or a lookup table and may be determined e.g. empirically, and may, as an example, be stored in at least one data storage device of the display device. For example, the predetermined and/or prerecorded and/or predefined beam profile may be determined during initial start-up of a mobile device comprising the display device. For example, the predetermined and/or prerecorded and/or predefined beam profile may be stored in at least one data storage device of the mobile device, e.g. by software, specifically by the app downloaded from an app store or the like. The reflection feature may be identified as to be generated by biological tissue in case the reflection beam profile and the predetermined and/or prerecorded and/or predefined beam profile are identical. The comparison may comprise overlaying the reflection beam profile and the predetermined or predefined beam profile such that their centers of intensity match. The comparison may comprise determining a deviation, e.g. a sum of squared point to point distances, between the reflection beam profile and the predetermined and/or prerecorded and/or predefined beam profile. The evaluation device may be configured for comparing the determined deviation with at least one threshold, wherein in case the determined deviation is below and/or equal the threshold the surface is indicated as biological tissue and/or the detection of biological tissue is confirmed. The threshold value may be stored in a table or a lookup table and may be determined e.g. empirically and may, as an example, be stored in at least one data storage device of the display device.

Additionally or alternatively, for identification if the reflection feature was generated by biological tissue, the evaluation device may be configured for applying at least one image filter to the image of the area. As further used herein, the term "image" refers to a two-dimensional function, f(x,y), wherein brightness and/or color values are given for any x,y-position in the image. The position may be discretized corresponding to the recording pixels. The brightness and/or color may be discretized corresponding to a bit-depth of the optical sensor. As used herein, the term "image filter" refers to at least one mathematical operation applied to the beam profile and/or to the at least one specific region of the beam profile. Specifically, the image filter $\phi$ maps an image f, or a region of interest in the image, onto a real number, $\phi(f(x,y))=\varphi$, wherein $\varphi$ denotes a feature, in particular a material feature. Images may be subject to noise and the same holds true for features. Therefore, features may be random variables. The features may be normally distributed. If features are not normally distributed, they may be transformed to be normally distributed such as by a Box-Cox-Transformation.

The evaluation device may be configured for determining at least one material feature $\phi_{2m}$ by applying at least one material dependent image filter $\phi_2$ to the image. As used herein, the term "material dependent" image filter refers to an image having a material dependent output. The output of the material dependent image filter is denoted herein "material feature $\varphi_{2m}$" or "material dependent feature $\varphi_{2m}$". The material feature may be or may comprise at least one information about the at least one material property of the surface of the area having generated the reflection feature.

The material dependent image filter may be at least one filter selected from the group consisting of: a luminance filter; a spot shape filter; a squared norm gradient; a standard deviation; a smoothness filter such as a Gaussian filter or median filter; a grey-level-occurrence-based contrast filter; a grey-level-occurrence-based energy filter; a grey-level-occurrence-based homogeneity filter; a grey-level-occurrence-based dissimilarity filter; a Law's energy filter; a threshold area filter; or a linear combination thereof; or a further material dependent image filter $\phi_{2other}$ which correlates to one or more of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof by $|\rho_{\phi 2other,\phi m}|\geq 0.40$ with $\phi_m$ being one of the luminance filter, the spot shape filter, the squared norm gradient, the standard deviation, the smoothness filter, the grey-level-occurrence-based energy filter, the grey-level-occurrence-based homogeneity filter, the grey-level-occurrence-based dissimilarity filter, the Law's energy filter, or the threshold area filter, or a linear combination thereof. The further material dependent image filter $\phi_{2other}$ may correlate to one or more of the material dependent image filters $\phi_m$ by $|\rho_{\phi 2other,\phi m}|\geq 0.60$, preferably by $|\rho_{\phi 2other,\phi m}|\geq 0.80$.

The material dependent image filter may be at least one arbitrary filter $\phi$ that passes a hypothesis testing. As used herein, the term "passes a hypothesis testing" refers to the fact that a Null-hypothesis $H_0$ is rejected and an alternative hypothesis $H_1$ is accepted. The hypothesis testing may comprise testing the material dependency of the image filter by applying the image filter to a predefined data set. The data set may comprise a plurality of beam profile images. As used herein, the term "beam profile image" refers to a sum of $N_B$ Gaussian radial basis functions, $$f_k(x, y) = \left|\sum_{l=0}^{N_B-1} g_{lk}(x, y)\right|,$$

$$g_{lk}(x, y) = a_{lk} e^{-(\alpha(x-x_{lk}))^2} e^{-(\alpha(y-y_{lk}))^2}$$

wherein each of the $N_B$ Gaussian radial basis functions is defined by a center $(x_{lk},y_{lk})$, a prefactor, $a_{lk}$, and an exponential factor $\alpha=1/\epsilon$. The exponential factor is identical for all Gaussian functions in all images. The center-positions, $x_{lk},y_{lk}$, are identical for all images $f_k$: $(x_0, x_1, \ldots, x_{N_B-1})$, $(y_0, y_1, \ldots, y_{N_B-1})$. Each of the beam profile images in the dataset may correspond to a material classifier and a distance. The material classifier may be a label such as 'Material A', 'Material B', etc. The beam profile images may be generated by using the above formula for $f_k(x,y)$ in combination with the following parameter table:

| Image Index | Material classifier, Material Index | Distance z | Parameters |
|---|---|---|---|
| k = 0 | Skin, m = 0 | 0.4 m | $(a_{00}, a_{10}, \ldots, a_{N_B-10})$ |
| k = 1 | Skin, m = 0 | 0.6 m | $(a_{01}, a_{11}, \ldots, a_{N_B-11})$ |
| k = 2 | Fabric, m = 1 | 0.6 m | $(a_{02}, a_{12}, \ldots, a_{N_B-12})$ |
| . | . | . | |
| k = N | Material J, m = J − 1 | | $(a_{0N}, a_{1N}, \ldots, a_{N_B-1N})$ |

The values for x, y, are integers corresponding to pixels with $$\binom{x}{y} \in [0, 1, \ldots 31]^2.$$

The images may have a pixel size of 32×32. The dataset of beam profile images may be generated by using the above formula for $f_k$ in combination with a parameter set to obtain a continuous description of $f_k$. The values for each pixel in the 32×32-image may be obtained by inserting integer values from 0, . . . , 31 for x, y, in $f_k(x,y)$. For example, for pixel (6,9), the value $f_k(6,9)$ may be computed.

Subsequently, for each image $f_k$, the feature value $\varphi_k$ corresponding to the filter $\phi$ may be calculated, $\Phi(f_k(x,y), z_k)=\varphi_k$, wherein $z_k$ is a distance value corresponding to the image $f_k$ from the predefined data set. This yields a dataset with corresponding generated feature values $\varphi_k$. The hypothesis testing may use a Null-hypothesis that the filter does not distinguish between material classifier. The Null-Hypothesis may be given by $H_0$: $\mu_1=\mu_2=\ldots=\mu_J$, wherein $\mu_m$ is the expectation value of each material-group corresponding to the feature values $\varphi_k$. Index m denotes the material group. The hypothesis testing may use as alternative hypothesis that the filter does distinguish between at least two material classifiers. The alternative hypothesis may be given by $H_1$: $\exists m, m': \mu_m \neq \mu_{m'}$. As used herein, the term "not distinguish between material classifiers" refers to that the expectation values of the material classifiers are identical. As used herein, the term "distinguishes material classifiers" refers to that at least two expectation values of the material classifiers differ. As used herein "distinguishes at least two material classifiers" is used synonymous to "suitable material classifier". The hypothesis testing may comprise at least one analysis of variance (ANOVA) on the generated feature values. In particular, the hypothesis testing may comprise determining a mean-value of the feature values for each of the J materials, i.e. in total J mean values, $$\bar{\varphi}_m = \frac{\sum_i \varphi_{i,m}}{N_m},$$

for $m \in [0, 1, \ldots, J-1]$, wherein $N_m$ gives the number of feature values for each of the J materials in the predefined data set. The hypothesis testing may comprise determining a mean-value of all N feature values $$\bar{\varphi} = \frac{\sum_m \sum_i \varphi_{i,m}}{N}.$$

The hypothesis testing may comprise determining a Mean Sum Squares within:

$$mssw = (\Sigma_m \Sigma_i (\varphi_{i,m} - \bar{\varphi}_m)^2)/(N-J).$$

The hypothesis testing may comprise determining a Mean Sum of Squares between, $$mssb = (\Sigma_m (\bar{\varphi}_m - \bar{\varphi})^2 N_m)/(J-1).$$

The hypothesis testing may comprise performing an F-Test:

$$CDF(x) = I_{\frac{d_1 x}{d_1 x + d_2}}\left(\frac{d_1}{2}, \frac{d_2}{2}\right), \text{ where } d_1 = N - J, d_2 = J - 1,$$

$$F(x) = 1 - CDF(x)$$

$$p = F(mssb/mssw)$$

Herein, $I_x$ is the regularized incomplete Beta-Function, $$I_x(a, b) = \frac{B(x; a, b)}{B(a, b)},$$

with the Euler Beta-Function $B(a,b)=\int_0^1 t^{a-1}(1-t)^{b-1}dt$ and $B(x; a,b)=\int_0^x t^{a-1}(1-t)^{b-1}dt$ being the incomplete Beta-Function. The image filter may pass the hypothesis testing if a p-value, p, is smaller or equal than a pre-defined level of significance. The filter may pass the hypothesis testing if $p \leq 0.075$, preferably $p \leq 0.05$, more preferably $p \leq 0.025$, and most preferably $p \leq 0.01$. For example, in case the pre-defined level of significance is $\alpha = 0.075$, the image filter may pass the hypothesis testing if the p-value is smaller than $\alpha = 0.075$. In this case the Null-hypothesis $H_0$ can be rejected and the alternative hypothesis $H_1$ can be accepted. The image filter thus distinguishes at least two material classifiers. Thus, the image filter passes the hypothesis testing.

In the following, image filters are described assuming that the reflection image comprises at least one reflection feature, in particular a spot image. A spot image $f$ may be given by a function $f: \mathbb{R}^2 \to \mathbb{R}_{\geq 0}$, wherein the background of the image f may be already subtracted. However, other reflection features may be possible.

For example, the material dependent image filter may be a luminance filter. The luminance filter may return a luminance measure of a spot as material feature. The material feature may be determined by $$\varphi_{2m} = \Phi(f, z) = -\int f(x)dx \frac{z^2}{d_{ray} \cdot n},$$

where f is the spot image. The distance of the spot is denoted by z, where z may be obtained for example by using a depth-from-defocus or depth-from-photon ratio technique and/or by using a triangulation technique. The surface normal of the material is given by $n \in \mathbb{R}^3$ and can be obtained as the normal of the surface spanned by at least three measured points. The vector $d_{ray} \in \mathbb{R}^3$ is the direction vector of the light source. Since the position of the spot is known by using a depth-from-defocus or depth-from-photon ratio technique and/or by using a triangulation technique wherein the position of the light source is known as a parameter of the display device, $d_{ray}$, is the difference vector between spot and light source positions.

For example, the material dependent image filter may be a filter having an output dependent on a spot shape. This material dependent image filter may return a value which correlates to the translucence of a material as material feature. The translucence of materials influences the shape of the spots. The material feature may be given by $$\varphi_{2m} = \Phi(f) = \frac{\int H(f(x) - \alpha h)dx}{\int H(f(x) - \beta h)dx},$$

wherein $0 < \alpha, \beta < 1$ are weights for the spot height h, and H denotes the Heavyside function, i.e. $H(x)=1: x \geq 0$, $H(x)=0: x<0$. The spot height h may be determined by $h = \int_{B_r} f(x)dx,$ where $B_r$ is an inner circle of a spot with radius r.

For example, the material dependent image filter may be a squared norm gradient. This material dependent image filter may return a value which correlates to a measure of soft and hard transitions and/or roughness of a spot as material feature. The material feature may be defined by $\varphi_{2m} = \Phi(f) = \int \|\nabla f(x)\|^2 dx.$ For example, the material dependent image filter may be a standard deviation. The standard deviation of the spot may be determined by $\varphi_{2m} = \Phi(f) = \int (f(x) - \mu)^2 dx,$ Wherein $\mu$ is the mean value given by $\mu = \int (f(x))dx$.

For example, the material dependent image filter may be a smoothness filter such as a Gaussian filter or median filter. In one embodiment of the smoothness filter, this image filter may refer to the observation that volume scattering exhibits less speckle contrast compared to diffuse scattering materials. This image filter may quantify the smoothness of the spot corresponding to speckle contrast as material feature. The material feature may be determined by $$\varphi_{2m} = \Phi(f, z) = \frac{\int |\mathcal{F}(f)(x) - f(x)|dx}{\int f(x)dx} \cdot \frac{1}{z},$$

wherein $\mathcal{F}$ is a smoothness function, for example a median filter or Gaussian filter. This image filter may comprise dividing by the distance z, as described in the formula above. The distance z may be determined for example using a depth-from-defocus or depth-from-photon ratio technique and/or by using a triangulation technique. This may allow the filter to be insensitive to distance. In one embodiment of the smoothness filter, the smoothness filter may be based on the standard deviation of an extracted speckle noise pattern. A speckle noise pattern N can be described in an empirical way by $$f(x) = f_0(x) \cdot (N(X)+1),$$

where $f_0$ is an image of a despeckled spot. N(X) is the noise term that models the speckle pattern. The computation of a despeckled image may be difficult. Thus, the despeckled image may be approximated with a smoothed version of f, i.e. $f_0 \approx \mathcal{F}(f)$, wherein $\mathcal{F}$ is a smoothness operator like a Gaussian filter or median filter. Thus, an approximation of the speckle pattern may be given by $$N(X) = \frac{f(x)}{\mathcal{F}(f(x))} - 1.$$

The material feature of this filter may be determined by $$\varphi_{2m} = \Phi(f) = \sqrt{\mathrm{Var}\left(\frac{f}{\mathcal{F}(f)} - 1\right)}.$$

Wherein Var denotes the variance function.

For example, the image filter may be a grey-level-occurrence-based contrast filter. This material filter may be based on the grey level occurrence matrix $M_{f,\rho}(g_1 g_2) = [p_{g1,g2}]$, whereas $p_{g1,g2}$ is the occurrence rate of the grey combination $(g_1, g_2) = [f(x_1, y_1), f(x_2, y_2)]$, and the relation $\rho$ defines the distance between $(x_1, y_1)$ and $(x_2, y_2)$, which is $\rho(x, y) = (x+a, y+b)$ with a and b selected from 0, 1.

The material feature of the grey-level-occurrence-based contrast filter may be given by $$\varphi_{2m} = \Phi(f) = \sum_{i,j=0}^{N-1} p_{ij}(i-j)^2.$$

For example, the image filter may be a grey-level-occurrence-based energy filter. This material filter is based on the grey level occurrence matrix defined above.

The material feature of the grey-level-occurrence-based energy filter may be given by $$\varphi_{2m} = \Phi(f) = \sum_{i,j=0}^{N-1} (p_{ij})^2.$$

For example, the image filter may be a grey-level-occurrence-based homogeneity filter. This material filter is based on the grey level occurrence matrix defined above.

The material feature of the grey-level-occurrence-based homogeneity filter may be given by $$\varphi_{2m} = \Phi(f) = \sum_{i,j=0}^{N-1} \frac{p_{ij}}{1+|i-j|}.$$

For example, the image filter may be a grey-level-occurrence-based dissimilarity filter. This material filter is based on the grey level occurrence matrix defined above.

The material feature of the grey-level-occurrence-based dissimilarity filter may be given by $$\varphi_{2m} = \Phi(f) = -\sum_{i,j=0}^{N-1} \sqrt{p_{ij} \log(p_{ij})}.$$

For example, the image filter may be a Law's energy filter. This material filter may be based on the laws vector $L_5 = [1, 4, 6, 4, 1]$ and $E_5 = [-1, -2, 0, -2, -1]$ and the matrices $L_5(E_5)^T$ and $E_5(L_5)^T$. The image $f_k$ is convoluted with these matrices:

$$f^*_{k,L5E5}(x,y) = \sum_{i=-2}^{2}\sum_{j=-2}^{2} f_k(x+i, y+j)L_5(E_5)^T$$

and $$f^*_{k,E5L5}(x,y) = \sum_{i=-2}^{2}\sum_{j=-2}^{2} f_k(x+i, y+j)E_5(L_5)^T.$$

$$E = \int \frac{f^*_{k,L5E5}(x,y)}{\max(f^*_{k,L5E5}(x,y))} dxdy,$$

$$F = \int \frac{f^*_{k,E5L5}(x,y)}{\max(f^*_{k,E5L5}(x,y))} dxdy,$$

Whereas the material feature of Law's energy filter may be determined by $$\varphi_{2m} = \Phi(f) = E/F.$$

For example, the material dependent image filter may be a threshold area filter. This material feature may relate two areas in the image plane. A first area $\Omega 1$, may be an area wherein the function f is larger than $\alpha$ times the maximum of f. A second area $\Omega 2$, may be an area wherein the function f is smaller than $\alpha$ times the maximum of f, but larger than a threshold value $\varepsilon$ times the maximum of f. Preferably $\alpha$ may be 0.5 and $\varepsilon$ may be 0.05. Due to speckles or noise, the areas may not simply correspond to an inner and an outer circle around the spot center. As an example, $\Omega 1$ may comprise speckles or unconnected areas in the outer circle. The material feature may be determined by $$\varphi_{2m} = \Phi(f) = \frac{\int_{\Omega 1} 1}{\int_{\Omega 2} 1},$$

wherein $\Omega 1 = \{x | f(x) > \alpha \cdot \max(f(x))\}$ and $\Omega 2 = \{x | \varepsilon \cdot \max(f(x)) < f(x) < \alpha \cdot \max(f(x))\}$.

The evaluation device may be configured for using at least one predetermined relationship between the material feature $\phi_{2m}$ and the material property of the surface having generated the reflection feature for determining the material property of the surface having generated the reflection feature. The predetermined relationship may be one or more of an empirical relationship, a semi-empiric relationship and an analytically derived relationship. The evaluation device may comprise at least one data storage device for storing the predetermined relationship, such as a lookup list or a lookup table.

The evaluation device is configured for identifying a reflection feature as to be generated by illuminating biological tissue in case its corresponding material property fulfills the at least one predetermined or predefined criterion. The reflection feature may be identified as to be generated by biological tissue in case the material property indicates "biological tissue". The reflection feature may be identified as to be generated by biological tissue in case the material property is below or equal at least one threshold or range, wherein in case the determined deviation is below and/or equal the threshold the reflection feature is identified as to be generated by biological tissue and/or the detection of biological tissue is confirmed. At least one threshold value and/or range may be stored in a table or a lookup table and may be determined e.g. empirically and may, as an example, be stored in at least one data storage device of the display device. The evaluation device is configured for identifying the reflection feature as to be background otherwise. Thus, the evaluation device may be configured for assigning each projected spot with a depth information and a material property, e.g. skin yes or no.

The material property may be determined by evaluating $\phi_{2m}$ subsequently after determining of the longitudinal coordinate z such that the information about the longitudinal coordinate z can be considered for evaluating of $\phi_{2m}$.

In a further aspect, the present invention discloses a method for depth measurement through a translucent display, wherein a display device according to the present invention is used. The method comprises the following steps:
- a) projecting at least one illumination pattern comprising a plurality of illumination features on at least one scene by using at least one illumination source, wherein the illumination source is placed in direction of propagation of the illumination pattern in front of the display;
- b) determining at least one first image comprising a plurality of reflection features generated by the scene in response to illumination by the illumination features by using at least one optical sensor, wherein the optical sensor has at least one light sensitive area, wherein the optical sensor is placed in direction of propagation of the illumination pattern in front of the display, wherein each of the reflection features comprises at least one beam profile;
- c) Evaluating the first image by using at least one evaluation device, wherein the evaluation comprises the following substeps:
    - C1) identifying the reflection features of the first image and sorting the identified reflection features with respect to brightness;
    - C2) determining at least one longitudinal coordinate $z_{DPR}$ for each of the reflection features by analysis of their beam profiles;
    - C3) unambiguously matching of reflection features with corresponding illumination features by using the longitudinal coordinate $z_{DPR}$, wherein the matching is performed with decreasing brightness of the reflection features starting with the brightest reflection feature;
    - C4) classifying a reflection feature being matched with an illumination feature as real feature and for classifying a reflection feature not being matched with an illumination feature as false feature;
    - C5) rejecting the false features and for generating the depth map for the real features by using the longitudinal coordinate $z_{DPR}$.

The method steps may be performed in the given order or may be performed in a different order. Further, one or more additional method steps may be present which are not listed. Further, one, more than one or even all of the method steps may be performed repeatedly. For details, options and definitions, reference may be made to the display device as discussed above. Thus, specifically, as outlined above, the method may comprise using the display device according to the present invention, such as according to one or more of the embodiments given above or given in further detail below.

The at least one evaluation device may be configured for performing at least one computer program, such as at least one computer program configured for performing or supporting one or more or even all of the method steps of the method according to the present invention. As an example, one or more algorithms may be implemented which may determine the position of the object.

In a further aspect of the present invention, use of the display device according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

With respect to further uses of the display device and devices of the present invention reference is made to WO 2018/091649 A1, WO 2018/091638 A1 and WO 2018/091640 A1, the content of which is included by reference.

Overall, in the context of the present invention, the following embodiments are regarded as preferred:

Embodiment 1: A display device comprising
- at least one illumination source configured for projecting at least one illumination pattern comprising a plurality of illumination features on at least one scene;
- at least one optical sensor having at least one light sensitive area, wherein the optical sensor is configured for determining at least one first image comprising a plurality of reflection features generated by the scene in response to illumination by the illumination features;
- at least one translucent display configured for displaying information, wherein the illumination source and the optical sensor are placed in direction of propagation of the illumination pattern in front of the display;
- at least one evaluation device, wherein the evaluation device is configured for evaluating the first image, wherein the evaluation of the first image comprises identifying the reflection features of the first image and sorting the identified reflection features with respect to brightness, wherein each of the reflection features comprises at least one beam profile, wherein the evaluation device is configured for determining at least one longitudinal coordinate $z_{DPR}$ for each of the reflection features by analysis of their beam profiles,
wherein the evaluation device is configured for unambiguously matching of reflection features with corresponding illumination features by using the longitudinal coordinate $z_{DPR}$, wherein the matching is performed with decreasing brightness of the reflection features starting with the brightest reflection feature, wherein the evaluation device is configured for classifying a reflection feature being matched with an illumination feature as real feature and for classifying a reflection feature not being matched with an illumination feature as false feature, wherein the evaluation device is configured for rejecting the false features and for generating a depth map for the real features by using the longitudinal coordinate $z_{DPR}$.

Embodiment 2: The display device according to the preceding embodiment, wherein the evaluation device is configured for determining at least one second longitudinal coordinate $z_{triang}$ for each of the reflection features using triangulation and/or depth-from-defocus and/or structured light techniques.

Embodiment 3: The display device according to the preceding embodiment, wherein the evaluation device is configured for determining a combined longitudinal coordinate of the second longitudinal coordinate $z_{triang}$ and the longitudinal coordinate $z_{DPR}$, wherein the combined longitudinal coordinate is a mean value of the second longitudinal coordinate $z_{triang}$ and the longitudinal coordinate $z_{DPR}$, wherein the combined longitudinal coordinate is used for determining the depth map.

Embodiment 4: The display device according to any one of the preceding embodiments, wherein the illumination source comprises at least one laser projector, wherein the laser projector comprises at least one laser source and at least one diffractive optical element (DOE).

Embodiment 5: The display device according to any one of the preceding embodiments, wherein the illumination source is configured for generating at least one light beam having a beam path passing from the illumination source through the display to the scene, wherein the display is configured for functioning as grating such that the light beam experiences diffraction by the display which results in the point pattern.

Embodiment 6: The display device according to the preceding embodiment, wherein a wiring of the display is configured for forming gaps and/or slits and ridges of the grating.

Embodiment 7: The display device according to any one of the preceding embodiments, wherein the illumination pattern comprises a periodic point pattern.

Embodiment 8: The display device according to any one of the preceding embodiments, wherein the illumination pattern has a low point density, wherein the illumination pattern has ≤2500 points per field of view.

Embodiment 9: The display device according to any one of the preceding embodiments, wherein the evaluation device is configured for determining the beam profile information for each of the reflection features by using depth-from-photon-ratio technique.

Embodiment 10: The display device according to any one of the preceding embodiments, wherein the optical sensor comprises at least one CMOS sensor.

Embodiment 11: The display device according to any one of the preceding embodiments, wherein the display device comprises a further illumination source, wherein the further illumination source comprises at least one light emitting diode (LED).

Embodiment 12: The display device according to the preceding embodiment, wherein the further illumination source is configured for generating light in the visual spectral range.

Embodiment 13: The display device according to any one of the two preceding embodiments, wherein the optical sensor is configured for determining at least one second image comprising at least one two dimensional image of the scene, wherein the further illumination source is configured for providing additional illumination for imaging of the second image.

Embodiment 14: The display device according to the preceding embodiment, wherein the evaluation device is configured for determining at least one corrected image $I_0$ by deconvoluting the second image I with a grating function g, wherein $I=I_0*g$.

Embodiment 15: Method for depth measurement through a translucent display, wherein at least one display device according to any one of the preceding embodiments is used, wherein the method comprises the following steps:
a) projecting at least one illumination pattern comprising a plurality of illumination features on at least one scene by using at least one illumination source, wherein the illumination source is placed in direction of propagation of the illumination pattern in front of the display;
b) determining at least one first image comprising a plurality of reflection features generated by the scene in response to illumination by the illumination features by using at least one optical sensor, wherein the optical sensor has at least one light sensitive area, wherein the optical sensor is placed in direction of propagation of the illumination pattern in front of the display, wherein each of the reflection features comprises at least one beam profile;
c) Evaluating the first image by using at least one evaluation device, wherein the evaluation comprises the following substeps:
C1) identifying the reflection features of the first image and sorting the identified reflection features with respect to brightness;
C2) determining at least one longitudinal coordinate $z_{DPR}$ for each of the reflection features by analysis of their beam profiles;
C3) unambiguously matching of reflection features with corresponding illumination features by using the longitudinal coordinate $z_{DPR}$, wherein the matching is performed with decreasing brightness of the reflection features starting with the brightest reflection feature;
C4) classifying a reflection feature being matched with an illumination feature as real feature and for classifying a reflection feature not being matched with an illumination feature as false feature;
C5) rejecting the false features and for generating the depth map for the real features by using the longitudinal coordinate $z_{DPR}$.

Embodiment 16: A use of the display device according to any one of the preceding embodiments relating to a display device, for a purpose of use, selected from the group consisting of: a position measurement in traffic technology; an entertainment application; a security application; a surveillance application; a safety application; a human-machine interface application; a tracking application; a photography application; an imaging application or camera application; a mapping application for generating maps of at least one space; a homing or tracking beacon detector for vehicles; an outdoor application; a mobile application; a communication application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments.

The exemplary embodiments are shown schematically in the figures. Identical reference numerals in the individual figures refer to identical elements or elements with identical function, or elements which correspond to one another with regard to their functions.

Specifically, in the figures:

FIGS. 1A and 1B show embodiments of a display device according to the present invention;

FIGS. 2A to 2C show embodiments of first images determined with at least one optical sensor of the display device;

FIGS. 3A to 3C show further embodiments of first images determined with at least one optical sensor of the display device;

FIG. 4 shows determining of a corrected 2D image using the display device; and

FIGS. 5A to 5C show a distorted 2D-image captured with a display, a 2D-image captured without the display and a corrected 2D-image.

DETAILED DESCRIPTION OF THE EMBODIMENTS

Figure 1A:
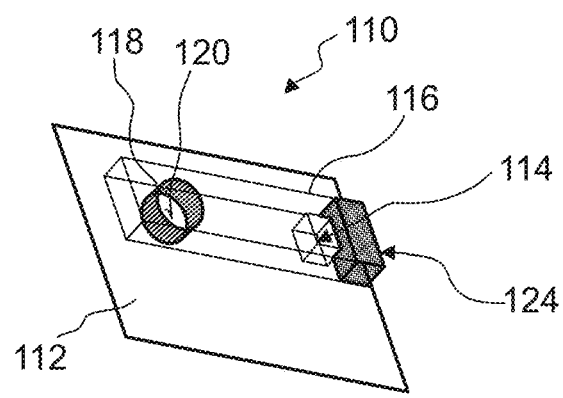

FIG. 1A shows in a highly schematic fashion an embodiment of a display device 110 according to the present invention. The display device 110 comprises at least one translucent display 112 configured for displaying information. The display 112 may be an arbitrary shaped device configured for displaying an item of information such as at least one image, at least one diagram, at least one histogram, at least one text, at least one sign. The display 112 may be at least one monitor or at least one screen. The display 112 may have an arbitrary shape, preferably a rectangular shape. For example, the display device 110 may be at least one device selected from the group consisting of: a television device, smart phones, game consoles, personal computers, laptops, tablets, at least one virtual reality device, or combinations thereof.

The display device 110 comprises at least one illumination source 114 configured for projecting at least one illumination pattern comprising a plurality of illumination features on at least one scene. The scene may be an object or spatial region, such as a face. The scene may comprise the at least one object and a surrounding environment.

The illumination source 114 may be adapted to directly or indirectly illuminating the scene, wherein the illumination pattern is reflected or scattered by surfaces of the scene and, thereby, is at least partially directed towards the optical sensor. The illumination source 114 may be adapted to illuminate the scene, for example, by directing a light beam towards the scene, which reflects the light beam. The illumination source 114 may be configured for generating an illuminating light beam for illuminating the scene.

The illumination source 114 may comprise at least one light source. The illumination source 114 may comprise a plurality of light sources. The illumination source 114 may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300 to 1100 nm, especially 500 to 1100 nm. Additionally or alternatively, light in the infrared spectral range may be used, such as in the range of 780 nm to 3.0 µm. Specifically, the light in the part of the near infrared region where silicon photodiodes are applicable specifically in the range of 700 nm to 1100 nm may be used. The illumination source 114 may be configured for generating the at least one illumination pattern in the infrared region. Using light in the near infrared region allows that light is not or only weakly detected by human eyes and is still detectable by silicon sensors, in particular standard silicon sensors. The illumination source 114 may be configured for emitting light at a single wavelength. Specifically, the wavelength may be in the near infrared region. In other embodiments, the illumination may be adapted to emit light with a plurality of wavelengths allowing additional measurements in other wavelengths channels The illumination source 114 may be or may comprise at least one multiple beam light source. For example, the illumination source 114 may comprise at least one laser source and one or more diffractive optical elements (DOEs). Specifically, the illumination source may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination source may comprise one or more diffractive optical elements (DOEs) adapted to generate the illumination pattern. For example, the illumination source 114 may be adapted to generate and/or to project a cloud of points, for example the illumination source may comprise one or more of at least one digital light processing projector, at least one LCoS projector, at least one spatial light modulator; at least one diffractive optical element; at least one array of light emitting diodes; at least one array of laser light sources. On account of their generally defined beam profiles and other properties of handleability, the use of at least one laser source as the illumination source 114 is particularly preferred. The illumination source 114 may be integrated into a housing 116 of the display device 110.

Further, the illumination source 114 may be configured for emitting modulated or non-modulated light. In case a plurality of illumination sources 114 is used, the different illumination sources may have different modulation frequencies which, as outlined in further detail below, later on may be used for distinguishing the light beams.

The illumination pattern may be at least one arbitrary pattern comprising at least one illumination feature adapted to illuminate at least one part of the scene. The illumination pattern may comprise a single illumination feature. The illumination pattern may comprise a plurality of illumination features. The illumination pattern may be selected from the group consisting of: at least one point pattern; at least one line pattern; at least one stripe pattern; at least one checkerboard pattern; at least one pattern comprising an arrangement of periodic or non periodic features. The illumination pattern may comprise regular and/or constant and/or periodic pattern such as a triangular pattern, a rectangular pattern, a hexagonal pattern or a pattern comprising further convex tilings. The illumination pattern may exhibit the at least one illumination feature selected from the group consisting of: at least one point; at least one line; at least two lines such as parallel or crossing lines; at least one point and one line; at least one arrangement of periodic or non-periodic feature; at least one arbitrary shaped featured. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination source may be adapted to generate and/or to project a cloud of points. The illumination source 114 may comprise the at least one light projector adapted to generate a cloud of points such that the illumination pattern may comprise a plurality of point pattern. The illumination source 114 may comprise at least one mask adapted to generate the illumination pattern from at least one light beam generated by the illumination source 114.

A distance between two features of the illumination pattern and/or an area of the at least one illumination feature may depend on the circle of confusion in the image. As outlined above, the illumination source may comprise the at least one light source configured for generating the at least one illumination pattern. Specifically, the illumination source 114 comprises at least one laser source and/or at least one laser diode which is designated for generating laser radiation. The illumination source 114 may comprise the at least one diffractive optical element (DOE). The display device 110 may comprise at least one point projector, such as the at least one laser source and the DOE, adapted to project at least one periodic point pattern.

For example, the projected illumination pattern may be a periodic point pattern. The projected illumination pattern may have a low point density. For example, the illumination pattern may comprise at least one periodic point pattern having a low point density, wherein the illumination pattern has ≤2500 points per field of view. In comparison with structured light having typically a point density of 10 k-30 k in a field of view of 55×38° the illumination pattern according to the present invention may be less dense. This may allow more power per point such that the proposed technique is less dependent on ambient light compared to structured light.

The display device 110 comprises at least one optical sensor 118 having at least one light sensitive area 120. The optical sensor 118 is configured for determining at least one first image 122, shown e.g. in FIGS. 2A to 2C and 3A to 3C, comprising a plurality of reflection features generated by the scene in response to illumination by the illumination features. The display device 110 may comprise a single camera comprising the optical sensor 118. The display device 110 may comprise a plurality of cameras each comprising an optical sensor 118 or a plurality of optical sensors 118.

The optical sensor 118 specifically may be or may comprise at least one photodetector, preferably inorganic photodetectors, more preferably inorganic semiconductor photodetectors, most preferably silicon photodetectors. Specifically, the optical sensor 118 may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensor 118 may be or may comprise at least one inorganic photodiode which are sensitive in the infrared spectral range, preferably in the range of 700 nm to 3.0 micrometers. Specifically, the optical sensor 118 may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX™ GmbH, D-67056 Ludwigshafen am Rhein, Germany. Thus, as an example, the optical sensor 118 may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensor 118 may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensor 118 may comprise at least one photoconductive sensor such as a PbS or PbSe sensor, a bolometer, preferably a bolometer selected from the group consisting of a VO bolometer and an amorphous Si bolometer.

The optical sensor 118 may be sensitive in one or more of the ultraviolet, the visible or the infrared spectral range. Specifically, the optical sensor may be sensitive in the visible spectral range from 500 nm to 780 nm, most preferably at 650 nm to 750 nm or at 690 nm to 700 nm. Specifically, the optical sensor 118 may be sensitive in the near infrared region. Specifically, the optical sensor 118 may be sensitive in the part of the near infrared region where silicon photodiodes are applicable specifically in the range of 700 nm to 1000 nm. The optical sensor 118, specifically, may be sensitive in the infrared spectral range, specifically in the range of 780 nm to 3.0 micrometers. For example, the optical sensor each, independently, may be or may comprise at least one element selected from the group consisting of a photodiode, a photocell, a photoconductor, a phototransistor or any combination thereof. For example, the optical sensor 118 may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, one or more photodiodes may be used, such as commercially available photodiodes, e.g. inorganic semiconductor photodiodes.

The optical sensor 118 may comprise at least one sensor element comprising a matrix of pixels. Thus, as an example, the optical sensor 118 may be part of or constitute a pixelated optical device. For example, the optical sensor 118 may be and/or may comprise at least one CCD and/or CMOS device. As an example, the optical sensor 118 may be part of or constitute at least one CCD and/or CMOS device having a matrix of pixels, each pixel forming a light-sensitive area. The sensor element may be formed as a unitary, single device or as a combination of several devices. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The pixels of the matrix specifically may be equal in one or more of size, sensitivity and other optical, electrical and mechanical properties. The light-sensitive areas 120 of all optical sensors 118 of the matrix specifically may be located in a common plane, the common plane preferably facing the scene, such that a light beam propagating from the object to the display device 110 may generate a light spot on the common plane. The light-sensitive area 120 may specifically be located on a surface of the respective optical sensor 118. Other embodiments, however, are feasible. The optical sensor 118 may comprise for example, at least one CCD and/or CMOS device. As an example, the optical sensor 118 may be part of or constitute a pixelated optical device. As an example, the optical sensor 118 may be part of or constitute at least one CCD and/or CMOS device having a matrix of pixels, each pixel forming a light-sensitive area 120.

The display device 110 comprises the at least one translucent display 112 configured for displaying information. The illumination source 114 and the optical sensor 118 are placed in direction of propagation of the illumination pattern in front of the display 112. The illumination source 114 and the optical sensor 118 may be arranged in a fixed position with respect to each other. For example, the setup of the display device 110 may comprise a camera, comprising the optical sensor 118 and a lens system, and a laser projector as illumination source 114. The laser projector and the camera may be fixed, in a direction of propagation of light reflected by the scene, behind the translucent display. The laser projector may generate a dot pattern and shines through the display 112. The camera may look through the display. The arrangement of the illumination source 114 and optical sensor 118 in a direction of propagation of light reflected by the scene, behind the translucent display, however, may result in that diffraction grating of the display 112 generates multiple laser points on the scene and also in the first image. Thereby these multiple spots on the first image may not include any useful distance information. The display device 110 comprises at least on evaluation device 124. The evaluation device 124 may be configured for finding and evaluating the reflection features of the zero order of diffraction grating, i.e. real features, and may neglect the reflection features of the higher orders, i.e. false features.

The evaluation device 124 is configured for evaluating the first image. The evaluation device 124 may comprise at least one data processing device and, more preferably, by using at least one processor and/or at least one application-specific integrated circuit. Thus, as an example, the at least one evaluation device 124 may comprise at least one data processing device having a software code stored thereon comprising a number of computer commands. The evaluation device 124 may provide one or more hardware elements for performing one or more of the named operations and/or may provide one or more processors with software running thereon for performing one or more of the named operations. Operations, including evaluating the images. Specifically, the determining the beam profile and indication of the surface, may be performed by the at least one evaluation device. Thus, as an example, one or more instructions may be implemented in software and/or hardware. Thus, as an example, the evaluation device 124 may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The evaluation of the first image comprises identifying the reflection features of the first image. The evaluation device 124 may be configured for performing at least one image analysis and/or image processing in order to identify the reflection features. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing a feature within the image generated by the optical sensor.

For example, the illumination source 114 may be configured for generating and/or projecting a cloud of points such that a plurality of illuminated regions is generated on the optical sensor 118, for example the CMOS detector. Additionally, disturbances may be present on the optical sensor 118 such as disturbances due to speckles and/or extraneous light and/or multiple reflections. The evaluation device 124 may be adapted to determine at least one region of interest, for example one or more pixels illuminated by the light beam which are used for determination of the longitudinal coordinate of the object. For example, the evaluation device 124 may be adapted to perform a filtering method, for example, a blob-analysis and/or an edge filter and/or object recognition method.

The evaluation device 124 may be configured for performing at least one image correction. The image correction may comprise at least one background subtraction. The evaluation device 124 may be adapted to remove influences from background light from the beam profile, for example, by an imaging without further illumination.

Each of the reflection features comprises at least one beam profile. The beam profile may be selected from the group consisting of a trapezoid beam profile; a triangle beam profile; a conical beam profile and a linear combination of Gaussian beam profiles. The evaluation device is configured for determining beam profile information for each of the reflection features by analysis of their beam profiles.

The evaluation device 124 is configured for determining at least one longitudinal coordinate $z_{DPR}$ for each of the reflection features by analysis of their beam profiles. For example, the analysis of the beam profile may comprise at least one of a histogram analysis step, a calculation of a difference measure, application of a neural network, application of a machine learning algorithm. The evaluation device 124 may be configured for symmetrizing and/or for normalizing and/or for filtering the beam profile, in particular to remove noise or asymmetries from recording under larger angles, recording edges or the like. The evaluation device 124 may filter the beam profile by removing high spatial frequencies such as by spatial frequency analysis and/or median filtering or the like. Summarization may be performed by center of intensity of the light spot and averaging all intensities at the same distance to the center. The evaluation device 124 may be configured for normalizing the beam profile to a maximum intensity, in particular to account for intensity differences due to the recorded distance. The evaluation device 124 may be configured for removing influences from background light from the beam profile, for example, by an imaging without illumination.

The evaluation device 124 may be configured for determining the longitudinal coordinate $z_{DPR}$ for each of the reflection features by using depth-from-photon-ratio technique. With respect to depth-from-photon-ratio (DPR) technique reference is made to WO 2018/091649 A1, WO 2018/091638 A1 and WO 2018/091640 A1, the full content of which is included by reference.

The evaluation device 124 may be configured for determining the beam profile of each of the reflection features. The determining the beam profile may comprise identifying at least one reflection feature provided by the optical sensor 118 and/or selecting at least one reflection feature provided by the optical sensor 118 and evaluating at least one intensity distribution of the reflection feature. As an example, a region of the image may be used and evaluated for determining the intensity distribution, such as a three-dimensional intensity distribution or a two-dimensional intensity distribution, such as along an axis or line through the image. As an example, a center of illumination by the light beam may be determined, such as by determining the at least one pixel having the highest illumination, and a cross-sectional axis may be chosen through the center of illumination. The intensity distribution may an intensity distribution as a function of a coordinate along this cross-sectional axis through the center of illumination. Other evaluation algorithms are feasible.

The analysis of the beam profile of one of the reflection features may comprise determining at least one first area and at least one second area of the beam profile. The first area of the beam profile may be an area A1 and the second area of the beam profile may be an area A2. The evaluation device 124 may be configured for integrating the first area and the second area. The evaluation device 123 may be configured to derive a combined signal, in particular a quotient Q, by one or more of dividing the integrated first area and the integrated second area, dividing multiples of the integrated first area and the integrated second area, dividing linear combinations of the integrated first area and the integrated second area. The evaluation device 124 may configured for determining at least two areas of the beam profile and/or to segment the beam profile in at least two segments comprising different areas of the beam profile, wherein overlapping of the areas may be possible as long as the areas are not congruent. For example, the evaluation device 124 may be configured for determining a plurality of areas such as two, three, four, five, or up to ten areas. The evaluation device 124 may be configured for segmenting the light spot into at least two areas of the beam profile and/or to segment the beam profile in at least two segments comprising different areas of the beam profile. The evaluation device 124 may be configured for determining for at least two of the areas an integral of the beam profile over the respective area. The evaluation device 124 may be configured for comparing at least two of the determined integrals. Specifically, the evaluation device 124 may be configured for determining at least one first area and at least one second area of the beam profile. The first area of the beam profile and the second area of the beam profile may be one or both of adjacent or overlapping regions. The first area of the beam profile and the second area of the beam profile may be not congruent in area. For example, the evaluation device 124 may be configured for dividing a sensor region of the CMOS sensor into at least two sub-regions, wherein the evaluation device may be configured for dividing the sensor region of the CMOS sensor into at least one left part and at least one right part and/or at least one upper part and at least one lower part and/or at least one inner and at least one outer part.

Additionally or alternatively, the display device 110 may comprise at least two optical sensors 118, wherein the light-sensitive areas of a first optical sensor and of a second optical sensor may be arranged such that the first optical sensor is adapted to determine the first area of the beam profile of the reflection feature and that the second optical sensor is adapted to determine the second area of the beam profile of the reflection feature. The evaluation device 124 may be adapted to integrate the first area and the second area. T In one embodiment, A1 may correspond to a full or complete area of a feature point on the optical sensor. A2 may be a central area of the feature point on the optical sensor. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

The evaluation device 124 may be configured to derive the quotient Q by one or more of dividing the first area and the second area, dividing multiples of the first area and the second area, dividing linear combinations of the first area and the second area. The evaluation device 124 may be configured for deriving the quotient Q by $$Q = \frac{\iint_{A1} E(x, y)dxdy}{\iint_{A2} E(x, y)dxdy}$$

wherein x and y are transversal coordinates, A1 and A2 are the first and second area of the beam profile, respectively, and E(x,y) denotes the beam profile.

The evaluation device 124 may be configured for using at least one predetermined relationship between the quotient Q and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The evaluation device 124 may be configured for executing at least one depth-from-photon-ratio algorithm which computes distances for all reflection features with zero order and higher order.

The evaluation of the first image comprises sorting the identified reflection features with respect to brightness. The sorting may comprise assigning a sequence of the reflection features for further evaluation with respect to brightness, in particular starting with the reflection feature having maximum brightness and subsequent the reflection features with decreasing brightness. The robustness of the determining of the longitudinal coordinate $z_{DPR}$ can be increased if the brightest reflection features are preferred for DPR computation. This is mainly because reflection features with zero order of diffraction grating are always brighter than false features with a higher order.

The evaluation device 124 is configured for unambiguously matching of reflection features with corresponding illumination features by using the longitudinal coordinate $z_{DPR}$. The longitudinal coordinate determined with the depth-from-photon-ratio technique can be used for solving the so called correspondence problem. In that way, distance information per reflection feature can be used to find the correspondence of the known laser projector grid.

The illumination feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that an illumination image, i.e. an image of the non-distorted illumination pattern, and the first image may be images determined at different spatial positions and/or spatial orientations having a fixed distance. The distance may be a relative distance, also denoted as baseline. The illumination image may be also denoted as reference image. The evaluation device 124 may be adapted to determine an epipolar line in the reference image. The relative position of the reference image and first image may be known. For example, the relative position of the reference image and the first image may be stored within at least one storage unit of the evaluation device. The evaluation device 124 may be adapted to determine a straight line extending from a selected reflection feature of the first image to a real world feature from which it originates. Thus, the straight line may comprise possible object features corresponding to the selected reflection feature. The straight line and the baseline span an epipolar plane. As the reference image is determined at a different relative constellation from the first image, the corresponding possible object features may be imaged on a straight line, called epipolar line, in the reference image. The epipolar line may be the intersection of the epipolar plane and the reference image. Thus, a feature of the reference image corresponding to the selected feature of the first image lies on the epipolar line.

Depending on the distance to the object of the scene having reflected the illumination feature, the reflection feature corresponding to the illumination feature may be displaced within the first image 122. The reference image may comprise at least one displacement region in which the illumination feature corresponding to the selected reflection feature would be imaged. The displacement region may comprise only one illumination feature. The displacement region may also comprise more than one illumination feature. The displacement region may comprise an epipolar line or a section of an epipolar line. The displacement region may comprise more than one epipolar line or more sections of more than one epipolar line. The displacement region may extend along the epipolar line, orthogonal to an epipolar line, or both. The evaluation device 124 may be adapted to determine the illumination feature along the epipolar line. The evaluation device 124 may be adapted to determine the longitudinal coordinate z for the reflection feature and an error interval ±ε from the combined signal Q to determine a displacement region along an epipolar line corresponding to z±ε or orthogonal to an epipolar line. The measurement uncertainty of the distance measurement using the combined signal Q may result in a displacement region in the second image which is non-circular since the measurement uncertainty may be different for different directions. Specifically, the measurement uncertainty along the epipolar line or epipolar lines may be greater than the measurement uncertainty in an orthogonal direction with respect to the epipolar line or lines. The displacement region may comprise an extend in an orthogonal direction with respect to the epipolar line or epipolar lines. The evaluation device 124 may be adapted to match the selected reflection feature with at least one illumination feature within the displacement region. The evaluation device 124 may be adapted to match the selected feature of the first image with the illumination feature within the displacement region by using at least one evaluation algorithm considering the determined longitudinal coordinate $z_{DPR}$. The evaluation algorithm may be a linear scaling algorithm. The evaluation device 124 may be adapted to determine the epipolar line closest to and/or within the displacement region. The evaluation device may be adapted to determine the epipolar line closest to the image position of the reflection feature. The extent of the displacement region along the epipolar line may be larger than the extent of the displacement region orthogonal to the epipolar line. The evaluation device 124 may be adapted to determine an epipolar line before determining a corresponding illumination feature. The evaluation device 124 may determine a displacement region around the image position of each reflection feature. The evaluation device 124 may be adapted to assign an epipolar line to each displacement region of each image position of the reflection features, such as by assigning the epipolar line closest to a displacement region and/or within a displacement region and/or closest to a displacement region along a direction orthogonal to the epipolar line. The evaluation device 124 may be adapted to determine the illumination feature corresponding to the reflection feature by determining the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 124 may be configured to perform the following steps:

Determining a displacement region for the image position of each reflection feature;

Assigning an epipolar line to the displacement region of each reflection feature such as by assigning the epipolar line closest to a displacement region and/or within a displacement region and/or closest to a displacement region along a direction orthogonal to the epipolar line;

Assigning and/or determining at least one illumination feature to each reflection feature such as by assigning the illumination feature closest to the assigned displacement region and/or within the assigned displacement region and/or closest to the assigned displacement region along the assigned epipolar line and/or within the assigned displacement region along the assigned epipolar line.

Additionally or alternatively, the evaluation device 124 may be adapted to decide between more than one epipolar line and/or illumination feature to be assigned to a reflection feature such as by comparing distances of reflection features and/or epipolar lines within the illumination image and/or by comparing error weighted distances, such as ε-weighted distances of illumination features and/or epipolar lines within the illumination image and assigning the epipolar line and/or illumination feature in shorter distance and/or ε-weighted distance to the illumination feature and/or reflection feature.

As outlined above, due to diffraction grating a plurality of reflection features, e.g. for each illumination feature one real feature and a plurality of false features, are generated. The matching is performed with decreasing brightness of the reflection features starting with the brightest reflection feature. No other reflection feature can be assigned to the same matched illumination feature. In due of the display artifacts, the false features which are generated are generally darker than the real features. By sorting the reflection features by brightness, brighter reflection features are preferred for the correspondence matching. If a correspondence of an illumination feature is already used, a false feature cannot be assigned to a used, i.e. matched, illumination feature.

Figure 2A:
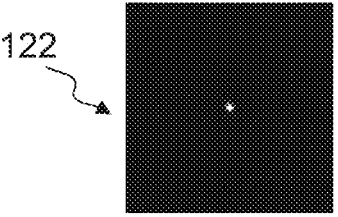
Figure 2B:
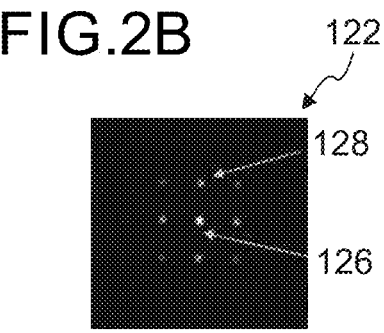
Figure 2C:
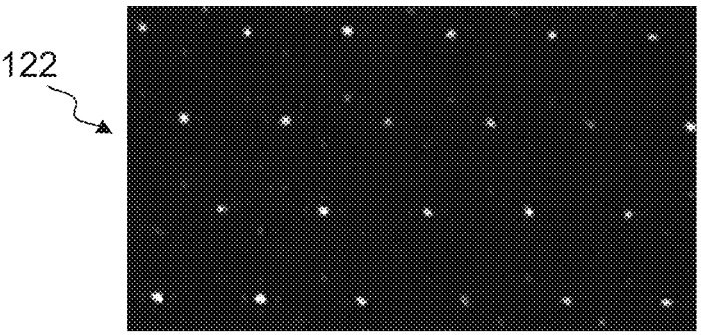

FIG. 2A shows a simulated first image 122 without the display 112 for an illumination pattern comprising a single light spot. FIG. 2B shows a first image 122 captured by the optical sensor 118 behind display 112. It is observed that the diffraction grating generate multiple spots. In FIG. 2B the real feature is shown as reference number 126 and exemplary a false feature is shown as reference number 128. FIG. 2C shows a further example of a first image 122 captured by the optical sensor 118 behind display 112, wherein in this case the illumination pattern is a projected laser grid. Multiple spots appear in due of diffraction grating.

Figure 3A:
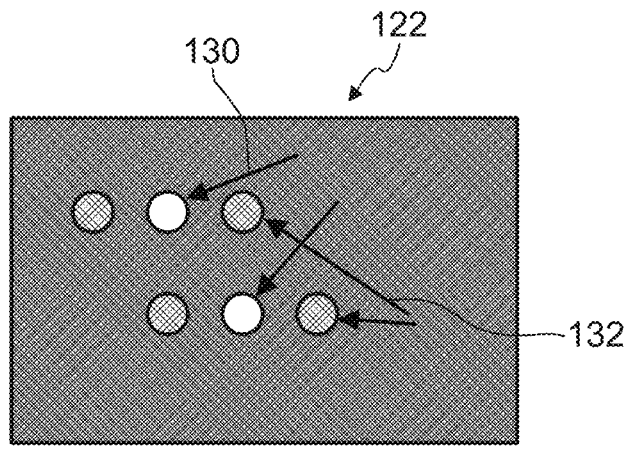
Figure 3B:
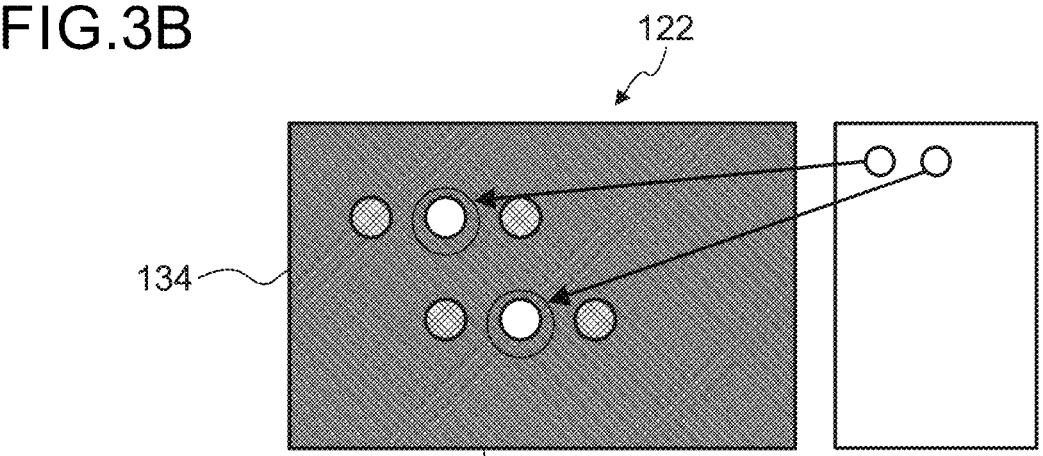
Figure 3C:
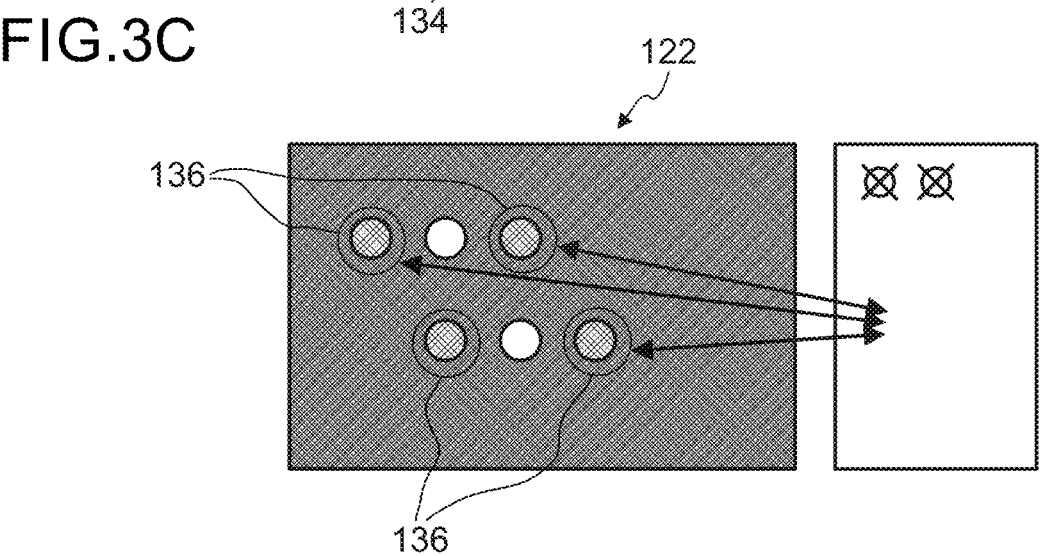

FIG. 3A shows a further exemplary first image 122 of a scene with projected laser spots. Reflection feature of zero order of diffraction grating 130 and of higher order 132 are shown. FIGS. 3B and 3C show matching of reflection features and illumination features. On the left part of FIGS. 3B and 3C the first image 122 is shown and on the right part a corresponding illumination pattern, comprising two illumination features. The first image 122 may comprise six reflection features. The evaluation device 124 may be configured for identifying the reflection features in the first image 122 and to sort them with respect to their brightness. As shown in FIG. 3B two of the reflection features may be brighter compared to the other reflection features. The evaluation device 124 may start beam profile analysis and matching with an illumination feature with one of the two brighter reflection features, denoted with circle 134. Each of two brighter reflection features may be matched with one illumination feature, denoted with an arrow. The evaluation device 124 may classify said matched features as real features. As depicted in FIG. 3C, the two illumination features of the illumination pattern are already matched with the brighter reflection features. No other reflection feature can be assigned to the same matched illumination feature. By sorting the reflection features by brightness, brighter reflection features are preferred for the correspondence matching. If a correspondence of an illumination feature is already used, a false feature cannot be assigned to a used, i.e. matched, illumination feature. Thus, the two remaining reflection features, denoted with circles 136, have no corresponding illumination feature and cannot be assigned to any point of the pattern. Said remaining reflection features are classified by the evaluation device 124 as false features.

The evaluation device 124 is configured for rejecting the false features and for generating a depth map for the real features by using the longitudinal coordinate $z_{DPR}$. The display device 110 may be used to generate a 3D map from a scene, e.g. of a face.

The depth map can be further refined by using a further depth measurement technique such as triangulation and/or depth-from-defocus and/or structured light. The evaluation device may be configured for determining at least one second longitudinal coordinate $z_{triang}$ for each of the reflection features using triangulation and/or depth-from-defocus and/or structured light techniques. The evaluation device 124 may be configured for determining a combined longitudinal coordinate of the second longitudinal coordinate $z_{triang}$ and the longitudinal coordinate $z_{DPR}$. The combined longitudinal coordinate may be a mean value of the second longitudinal coordinate $z_{triang}$ and the longitudinal coordinate $z_{DPR}$. The combined longitudinal coordinate may be used for determining the depth map.

Figure 1B:
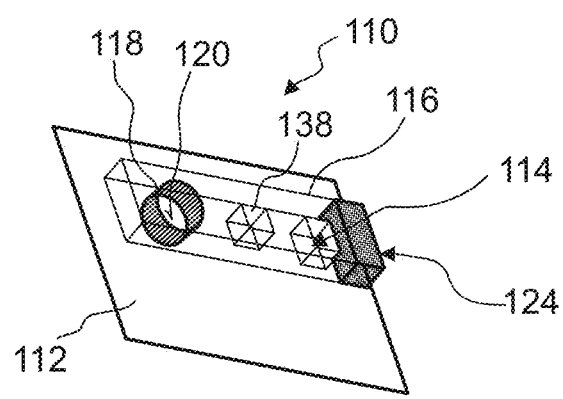

As shown in FIG. 1B, the display device 110 may comprise a further illumination source 138. The further illumination source 138 may comprise at least one light emitting diode (LED). The further illumination source 138 may be configured for generating light in the visual spectral range. The optical sensor 118 may be configured for determining at least one second image comprising at least one two dimensional image of the scene. The further illumination source 138 may be configured for providing additional illumination for imaging of the second image. For example, the setup of the display device 110 can be extended by an additional flood illumination LED. The further illumination source 138 may illuminate the scene, such as a face, with the LED and, in particular, without the illumination pattern, and the optical sensor 118 may be configured for capturing the two-dimensional image. The 2D image may be used for face detection and verification algorithm.

The distorted image captured by the optical sensor 118 can be repaired, if an impulse response of the display 112 is known. The evaluation device 124 may be configured for determining at least one corrected image $I_0$ by deconvoluting the second image I with a grating function g, wherein $I=I_0*g$. The grating function is also denoted impulse response. The undistorted image can be restored by a deconvolution approach, e.g. Van-Cittert or Wiener Deconvolution.

Figure 4:
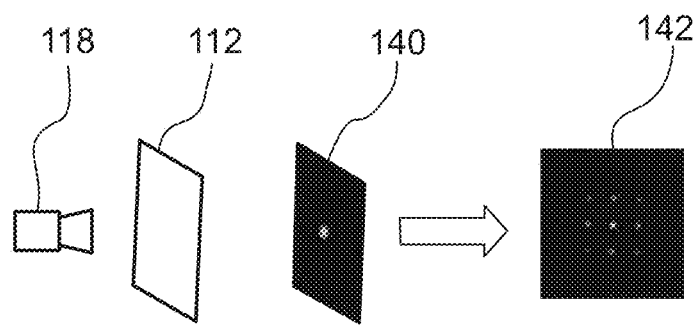
Figure 5A:
Figure 5B:
Figure 5C:

As shown in FIG. 4, the display device 110 may be configured for determining the grating function g. The display device 110 may be configured for illuminating a black scene with an illumination pattern comprising a small single bright spot, denoted with reference number 140. The captured image 142 may be the grating function. This procedure may be performed only once such as during calibration. For determining a corrected image even for imaging through the display 112, the display device 110 may be configured for capturing the image and use the deconvolution approach with the captured impulse response g. The resulting image may be a reconstructed image with less artifacts of the display and can be used for several applications, e.g. face recognition. FIGS. 5A to 5C show examples of two-dimensional images captured with the optical sensor 118. In FIG. 5A the exemplary scene was captured with the optical sensor 118 behind the display 112. In FIG. 5B the exemplary scene was captured with the optical sensor 118 without the display 112. FIG. 5C shows the reconstructed image with the deconvolution approach.

LIST OF REFERENCE NUMBERS 110 display device
112 display
114 illumination source
116 housing
118 optical sensor
120 light-sensitive area
122 first image
124 evaluation device
126 real feature
128 false feature
130 zero order of diffraction grating
132 higher order
134 circle
136 circle
138 further illumination source
140 for illuminating a black scene
142 captured image

CITED REFERENCES

DE 20 2018 003 644 U1
U.S. Pat. No. 9,870,024 B2
U.S. Pat. No. 10,057,541 B2
U.S. Pat. No. 10,215,988 B2
WO 2018/091649 A1
WO 2018/091638 A1
WO 2018/091640 A1
WO 2019/042956 A1

The invention claimed is:

1. A display device comprising
   a. at least one illumination source configured for projecting at least one illumination pattern comprising a plurality of illumination features on at least one scene;
   b. at least one optical sensor having at least one light sensitive area, wherein the at least one optical sensor is configured for determining at least one first image comprising a plurality of reflection features generated by the at least one scene in response to illumination by the illumination features;
   c. at least one translucent display configured for displaying information, wherein the at least one illumination source and the at least one optical sensor are placed in direction of propagation of the at least one illumination pattern in front of the at least one translucent display; and
   d. at least one evaluation device for analyzing the at least one first image, wherein the at least one evaluation device is configured for unambiguously matching of reflection features with corresponding illumination features; wherein evaluation of the at least one first image comprises identifying the plurality of reflection features of the at least one first image with corresponding illumination features, determining a brightness of the plurality of reflection features with corresponding illumination features and matching based on the brightness, wherein the evaluation device is configured for classifying a reflection feature being matched with an illumination feature as a real feature and for classifying a reflection feature not being matched with an illumination feature as a false feature, wherein the real feature is a reflection feature of zero order and the false feature is a reflection feature of an order greater than zero.

2. The display device according to claim 1, wherein the evaluation of the at least one first image further comprises sorting the plurality of reflection features with corresponding illumination features with respect to brightness, and wherein the matching is performed with decreasing brightness of the plurality of reflection features with corresponding illumination features starting with the brightest reflection feature.

3. The display device according to claim 1, wherein the evaluation device is further configured for rejecting each false feature and for generating a depth map for each real feature by using a longitudinal coordinate.

4. The display device according to claim 1, wherein the at least one illumination pattern comprises a periodic point pattern.

5. The display device according to claim 4, wherein the periodic point pattern is a triangular pattern, a hexagonal pattern, or a rectangular pattern.

6. The display device according to claim 5, wherein the periodic point pattern has ≤2500 points per field of view.

7. The display device according to claim 6, wherein light emitted by the at least one illumination source has a wavelength of 500 to 1100 nm.

8. The display device according to claim 1, wherein light emitted by the at least one illumination source has a wavelength of 940 nm.

9. The display device according to claim 1, wherein the at least one illumination pattern has ≤2500 points per field of view.

10. The display device according to claim 1, wherein the at least one illumination source is configured for generating at least one light beam having a beam path passing from the at least one illumination source through the at least one translucent display to the scene, wherein the at least one translucent display is configured for functioning as grating such that the light beam experiences diffraction by the at least one translucent display which results in the at least one illumination pattern.

11. The display device according to claim 1, wherein illumination source comprises an array of vertical cavity surface-emitting lasers.

12. The display device according to claim 1, wherein illumination source comprises a diffractive optical element.

13. The display device according to claim 1, wherein the at least one optical sensor is configured for determining at least one second image comprising at least one two-dimensional image of the scene.

14. The display device according to claim 1, wherein the evaluation of the at least one first image further comprises a selection of at least one region of interest.

15. The display device according to claim 1, wherein the evaluation of the at least one first image further comprises assigning a reflection feature to an illumination feature using epipolar geometry.

16. The display device according to claim 1, wherein the evaluation device performs a face recognition.

17. The display device according to claim 1, wherein the evaluation device is configured for determining at least one material property of an object by evaluating a beam profile of at least one of the plurality of reflection features with corresponding illumination features.

18. The display device according to claim 17, wherein the at least one material property is a property characterizing the material as biological or non-biological material.

19. The display device according to claim 18, wherein the evaluation device performs a face recognition.

* * * * *